US012749596B2

(12) United States Patent
Webb et al.

(10) Patent No.: US 12,749,596 B2
(45) Date of Patent: Sep. 29, 2026

(54) STRENGTH MEMBER ASSEMBLIES AND OVERHEAD ELECTRICAL CABLES INCORPORATING OPTICAL FIBERS

(71) Applicant: CTC Global Corporation, Irvine, CA (US)

(72) Inventors: William Webb, Laguna Niguel, CA (US); Xiaoyuan Dong, Johns Creek, GA (US); Christopher Wong, Santa Ana, CA (US); Ian M. Pilling, Rancho Santa Margarita, CA (US); Douglas A. Pilling, Bonita, CA (US)

(73) Assignee: CTC Global Corporation, Irvine, CA (US)

( * ) Notice: Subject to any disclaimer, the term of this patent is extended or adjusted under 35 U.S.C. 154(b) by 475 days.

(21) Appl. No.: 17/921,207

(22) PCT Filed: Apr. 29, 2021

(86) PCT No.: PCT/US2021/030016
§ 371 (c)(1),
(2) Date: Oct. 25, 2022

(87) PCT Pub. No.: WO2021/222663
PCT Pub. Date: Nov. 4, 2021

(65) Prior Publication Data
US 2023/0178267 A1 Jun. 8, 2023

Related U.S. Application Data

(60) Provisional application No. 62/704,242, filed on Apr. 29, 2020.

(51) Int. Cl.
*H01B 9/00* (2006.01)
*G02B 6/44* (2006.01)
(Continued)

(52) U.S. Cl.
CPC ............... *H01B 9/005* (2013.01); *G02B 6/44* (2013.01); *H01B 1/18* (2013.01); *H01B 9/008* (2013.01);
(Continued)

(58) Field of Classification Search
CPC ........ G02B 6/443; G02B 6/44; G02B 6/4401; G02B 6/4422; G02B 6/4429;
(Continued)

(56) References Cited

U.S. PATENT DOCUMENTS 4,416,508 A * 11/1983 Dey .................... G02B 6/4403
174/70 R
4,632,506 A 12/1986 Taylor
(Continued)

FOREIGN PATENT DOCUMENTS

AU 2002314115 B2 * 2/2007 ............ G02B 6/443
CA 2173887 A1 10/1996
(Continued)

OTHER PUBLICATIONS

CN_103854722_A (English Translation) (Year: 2014).*
(Continued)

*Primary Examiner* — Thomas A Hollweg
*Assistant Examiner* — Mary A El-Shammaa
(74) *Attorney, Agent, or Firm* — David F Dockery; The Navitas Intellectual Property Group LLC

(57) ABSTRACT

Strength member assemblies including a strength member and at least one glass optical fiber operatively coupled to the strength member. The optical fiber is coupled to the strength member in a manner such that mechanical strains experienced by the strength member are transferred to the optical fiber so that the optical fiber may be interrogated to assess the state of the strength member.

16 Claims, 25 Drawing Sheets

(51) Int. Cl.
*H01B 1/18* (2006.01)
*H01B 13/00* (2006.01)
*H02G 1/00* (2006.01)

(52) U.S. Cl.
CPC ......... *H01B 13/0036* (2013.01); *H02G 1/005* (2013.01)

(58) Field of Classification Search
CPC .. G02B 6/4432; G02B 6/4433; G02B 6/4434; G02B 6/38875; H01B 1/24; H01B 1/22; H01B 1/007; H01B 1/18; H01B 9/005; H01B 9/008; H01B 13/0036; H02G 1/005; H02G 1/00; H02G 1/02; H02G 3/00; H02G 7/00
See application file for complete search history.

(56) References Cited

U.S. PATENT DOCUMENTS

| | | | | | |
|---|---|---|---|---|---|
| 4,859,025 | A | | 8/1989 | Houghton | |
| 5,015,063 | A | | 5/1991 | Panuska et al. | |
| 5,315,813 | A | | 5/1994 | Ito et al. | |
| 5,727,100 | A | | 3/1998 | Grajewski et al. | |
| 5,787,217 | A | * | 7/1998 | Traut | G02B 6/443 385/100 |
| 9,316,801 | B1 | * | 4/2016 | Kithuka | H01B 11/10 |
| 9,335,502 | B1 | | 5/2016 | Wysocki et al. | |
| 9,640,986 | B2 | * | 5/2017 | Politis | H02H 9/041 |
| 9,728,302 | B1 | * | 8/2017 | McNutt | G02B 6/4436 |
| 9,741,468 | B2 | | 8/2017 | León-Guarena et al. | |
| 9,778,430 | B2 | * | 10/2017 | DeMeritt | G02B 6/4284 |
| 9,847,153 | B2 | | 12/2017 | Johansson et al. | |
| 9,972,422 | B1 | * | 5/2018 | Sekhavat | H01B 13/0036 |
| 10,345,544 | B1 | * | 7/2019 | Shen | G02B 6/4436 |
| 10,641,840 | B2 | * | 5/2020 | Wang | H02G 7/00 |
| 10,782,498 | B2 | * | 9/2020 | Reagan | G02B 6/44528 |
| 11,250,972 | B1 | * | 2/2022 | Evans | G02B 6/4416 |
| 11,329,467 | B2 | | 5/2022 | Bosze et al. | |
| 12,261,422 | B2 | | 3/2025 | Webb et al. | |
| 2002/0110311 | A1 | | 8/2002 | Kline | |
| 2004/0252954 | A1 | * | 12/2004 | Ginocchio | G02B 6/443 385/100 |
| 2005/0147362 | A1 | | 7/2005 | Carpenter et al. | |
| 2010/0243320 | A1 | | 9/2010 | Bryant et al. | |
| 2012/0082422 | A1 | | 4/2012 | Sarchi et al. | |
| 2012/0090892 | A1 | | 4/2012 | Meyer et al. | |
| 2012/0128309 | A1 | | 5/2012 | Kachmar et al. | |
| 2017/0288383 | A1 | | 10/2017 | Quesnel | |
| 2018/0156848 | A1 | * | 6/2018 | Ospina Ramirez | H01B 9/04 |
| 2020/0126691 | A1 | | 4/2020 | Varkey et al. | |
| 2020/0174214 | A1 | | 6/2020 | Alves et al. | |
| 2020/0194989 | A1 | | 6/2020 | Pilling | |
| 2020/0219638 | A1 | * | 7/2020 | Williams | H01B 11/06 |
| 2020/0343711 | A1 | | 10/2020 | Bosze et al. | |
| 2021/0048469 | A1 | * | 2/2021 | Dong | G01M 11/086 |
| 2022/0385055 | A1 | | 12/2022 | Dong et al. | |
| 2024/0103239 | A1 | * | 3/2024 | Webb | G02B 6/4422 |

FOREIGN PATENT DOCUMENTS

| | | | | | |
|---|---|---|---|---|---|
| CN | 201285461 | Y | * | 8/2009 | |
| CN | 103854722 | A | * | 6/2014 | G01K 11/32 |
| CN | 103874949 | A | | 6/2014 | |
| CN | 104871256 | A | * | 8/2015 | D07B 1/025 |
| CN | 107077923 | A | * | 8/2017 | H01B 7/02 |
| CN | 109085684 | A | | 12/2018 | |
| CN | 109300605 | A | * | 2/2019 | H01B 7/32 |
| CN | 105911657 | B | * | 8/2019 | G02B 6/443 |
| DE | 2064023 | C2 | | 8/1975 | |
| JP | S5758222 | U | | 4/1982 | |
| JP | 814648 | B2 | | 2/1996 | |
| JP | 2005201946 | A | | 7/2005 | |
| KR | 2019970003043 | Y1 | | 4/1997 | |
| KR | 20080106224 | A | | 12/2008 | |
| KR | 2014070971 | A | * | 6/2014 | G02B 6/04 |
| KR | 101749879 | B1 | | 6/2017 | |
| KR | 20200111220 | A | | 9/2020 | |
| TW | 363195 | B | | 7/1999 | |
| WO | WO-9422039 | A1 | * | 9/1994 | G02B 6/4402 |
| WO | 2018053616 | A1 | | 3/2018 | |
| WO | WO-2019168998 | A1 | * | 9/2019 | B24D 13/14 |
| WO | 2020181248 | A2 | | 9/2020 | |
| WO | 2021181265 | A1 | | 9/2021 | |

OTHER PUBLICATIONS

CN_104871256_A (English Translation) (Year: 2015).*
CN_105911657_B (English Translation) (Year: 2019).*
CN_109300605_A (English Translation) (Year: 2019).*
CN_201285461_Y (English Translation) (Year: 2009).*
JP_2005201946_A (English Translation) (Year: 2005).*
CN_107077923_A (English Translation) (Year: 2017).*
KR-20140070971-A (English Translation) (Year: 2014).*
PCT International Search Report and Written Opinion of the International Searching Authority dated Aug. 20, 2021 for PCT Application No. PCT/US2021/030016.
Office Action dated Apr. 1, 2022 for Pakistani Patent Application No. 330/2021.
Extended European Search Report dated Apr. 12, 2024 for European Patent Application No. 21795604.4.
Office Action dated Sep. 23, 2024 for Argentine Patent Application No. 20210101161.
Third party observations dated Oct. 27, 2023 for European Patent Application No. 21795604.4.
International Search Report and Written Opinion of the International Searching Authority for PCT/US2021/038778 dated Dec. 3, 2021.
Office Action dated Nov. 22, 2024 for Taiwan Patent Application No. 110115662.
Extended European Search Report dated Feb. 7, 2025 for European Patent Application No. 21929396.6.
Final Office Action dated Feb. 17, 2026 for U.S. Appl. No. 18/548,979.
Office Action dated Aug. 18, 2025 for Korean patent application No. 10-2023-7033730.
Office Action dated Feb. 2, 2026 for Indian Patent Application No. 202217068615.
Office Action dated Jul. 2, 2025 for U.S. Appl. No. 18/548,979.
Office Action dated Jul. 7, 2025 for Korean patent application No. 10-2022-7041862.
Office Action dated Mar. 26, 2026 for Chinese Patent Application No. 2021800446839.

* cited by examiner

STRENGTH MEMBER ASSEMBLIES AND OVERHEAD ELECTRICAL CABLES INCORPORATING OPTICAL FIBERS

CROSS-REFERENCE TO RELATED APPLICATIONS

This application claims the priority benefit of U.S. Provisional Patent Application No. 62/704,242 filed on Apr. 29, 2020.

FIELD

This disclosure relates to the field of overhead electrical cables, particularly configurations and methods for incorporating optical fibers into overhead electrical cables.

DESCRIPTION OF THE EMBODIMENTS

Overhead electrical cables (e.g., for the transmission and/or distribution of electricity) have traditionally been constructed using a steel strength member surrounded by a plurality of conductive aluminum strands that are helically wrapped around the steel strength member, a configuration referred to as "aluminum conductor steel reinforced" (ACSR). Recently, overhead electrical cables having a fiber-reinforced composite strength member have been manufactured and deployed in many electrical lines. As compared to steel, the fiber-reinforced composite materials used for the strength member have a lighter weight and lower thermal expansion.

Figure 1A:
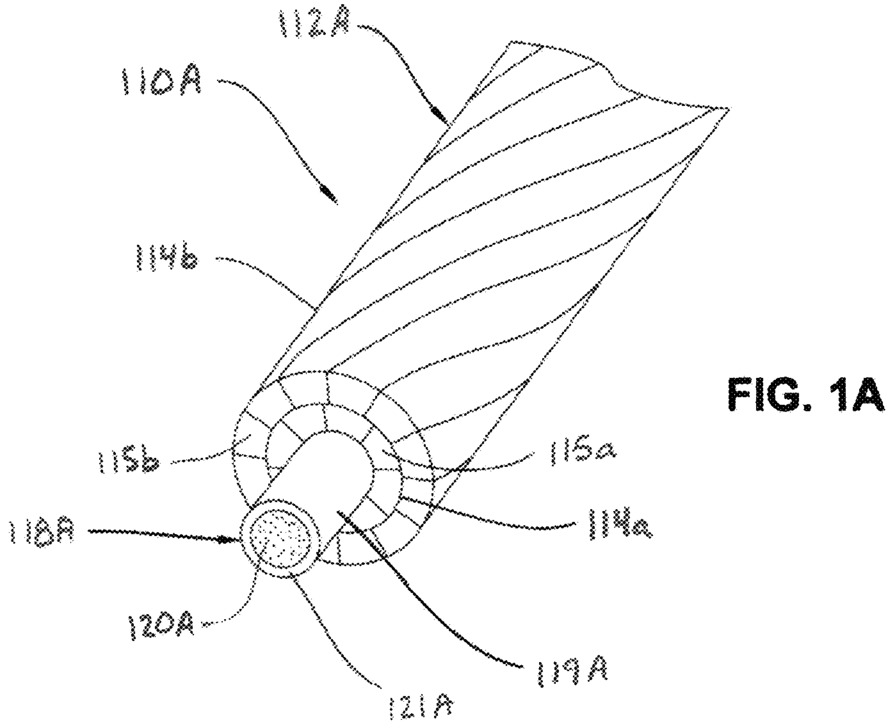
FIGS. 1A and 1B illustrate two examples of an overhead electrical cable having a composite strength member according to the prior art.
Figure 1B:
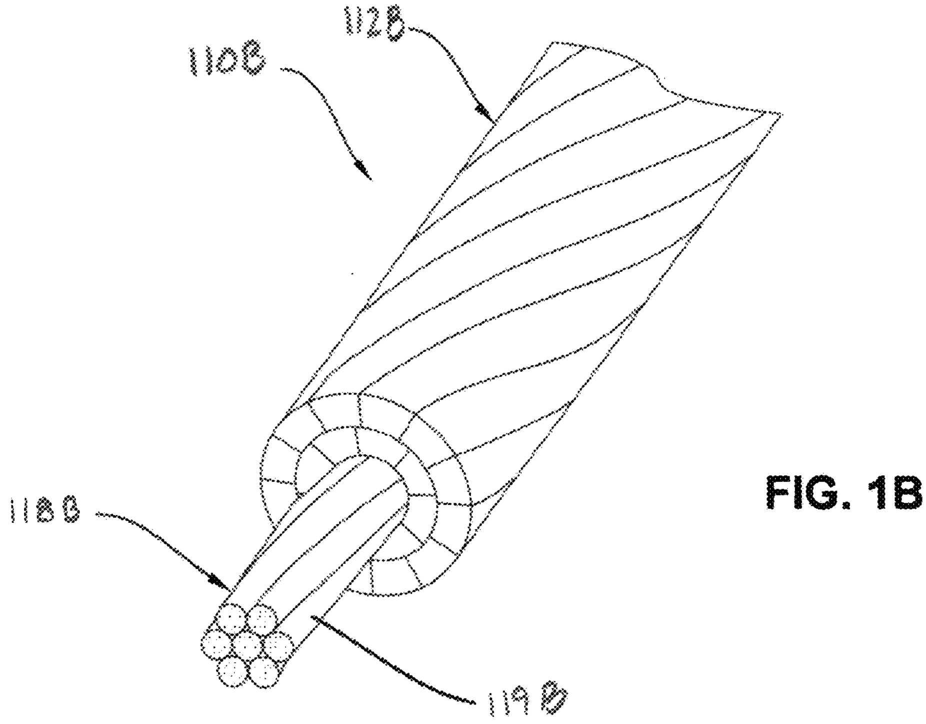
FIG. 1B PRIOR ART

FIG. 1A, and many of the figures that follow, illustrate a perspective view of an electrical cable with a portion of the electrical conductor removed to show the underlying components, e.g., the strength member assembly including a strength member. In the configuration illustrated in FIG. 1A, the fiber-reinforced composite strength member includes a single fiber-reinforced composite strength element (e.g., a single rod). An example of such a configuration is disclosed in U.S. Pat. No. 7,368,162 by Hiel et al., which is incorporated herein by reference in it is entirety. Alternatively, the composite strength member may be comprised of a plurality of individual fiber-reinforced composite strength elements (e.g., individual rods) that are operatively combined (e.g., twisted or stranded together) to form the strength member, as is illustrated in FIG. 1B. Examples of such multi-element composite strength members include, but are not limited to: the multi-element aluminum matrix composite strength member illustrated in U.S. Pat. No. 6,245,425 by McCullough et al.; the multi-element carbon fiber strength member illustrated in U.S. Pat. No. 6,015,953 by Tosaka et al.; and the multi-element strength member illustrated in U.S. Pat. No. 9,685,257 by Daniel et al. Each of these U.S. patents is incorporated herein by reference in its entirety. Other configurations for the fiber-reinforced composite strength member may be implemented as is known to those skilled in the art.

Referring to the overhead electrical cable illustrated in FIG. 1A, the electrical cable 110A includes an electrical conductor 112A that includes a first conductive layer 114*a* and a second conductive layer 114*b*, each comprising a plurality of individual conductive strands (e.g., strands 115*a* and 115*b*) that are helically wrapped around a fiber-reinforced composite strength member 118A. It will be appreciated that such overhead electrical cables may include a single conductive layer, or more than two conductive layers, depending upon the desired use of the overhead electrical cable. The conductive strands may be fabricated from conductive metals such as copper or aluminum, and for use in bare overhead electrical cables are typically fabricated from aluminum, e.g., hardened aluminum, annealed aluminum, or aluminum alloys. The conductive strands illustrated in FIG. 1A have a substantially trapezoidal cross-section, although other configurations may be employed, such as circular cross-sections. The use of polygonal cross-sections such as the trapezoidal cross-section advantageously increases the cross-sectional area of conductive metal for the same effective cable diameter, e.g., as compared to strands having a circular cross-section.

The conductive materials, e.g., aluminum, do not have sufficient mechanical properties (e.g., sufficient tensile strength) to be self-supporting when strung between support towers to form an overhead electrical line for transmission and/or distribution of electricity. In this regard, the strength member 118A supports the conductive layers 114*a*/114*b* when the overhead electrical cable 110A is strung between the support towers under high mechanical tension. In the embodiment illustrated in FIG. 1A, the strength member 118A includes a single (e.g., only one) strength element 120A. The strength element 119A includes a fiber-reinforced composite core 120A of high strength carbon reinforcing fibers in a binding matrix, and a galvanic layer 121A disposed around the fiber-reinforced composite core 120A to prevent contact between the carbon fibers and the first conductive layer 114*a*.

FIG. 1B illustrates an embodiment of an overhead electrical cable 110B that is similar to the electrical cable illustrated in FIG. 1A, where the strength member 118B comprises a plurality of individual strength elements (e.g., strength element 119B) that are stranded or twisted together to form the strength member 118B. Although illustrated in FIG. 1B as including seven individual strength elements, it will be appreciated that a multi-element strength member may include any number of strength elements that is suitable for a particular application.

As noted above, the fiber-reinforced composite material from which the strength elements, e.g., the high tensile strength core, are constructed may include reinforcing fibers that are operatively disposed in a binding matrix. The reinforcing fibers may be substantially continuous reinforcing fibers that extend along the length of the fiber-reinforced composite, and/or may be short reinforcing fibers (e.g., fiber whiskers or chopped fibers) that are dispersed through the binding matrix. The reinforcing fibers may be selected from a wide range of materials including, but not limited to, carbon, glass, boron, metal oxides, metal carbides, high-strength polymers such as aramid fibers or fluoropolymer fibers, basalt fibers and the like. Carbon fibers are particularly advantageous in many applications due to their very high tensile strength, and/or due to their relatively low coefficient of thermal expansion (CTE).

The binding matrix may include, for example, a plastic (e.g., polymer) such as a thermoplastic polymer or a thermoset polymer. For example, the binding matrix may include a thermoplastic polymer, including semi-crystalline thermoplastics. Specific examples of useful thermoplastics include, but are not limited to, polyether ether ketone (PEEK), polypropylene (PP), polyphenylene sulfide (PPS), polyetherimide (PEI), liquid crystal polymer (LCP), polyoxymethylene (POM, or acetal), polyamide (PA, or nylon), polyethylene (PE), fluoropolymers and thermoplastic polyesters.

The binding matrix may also include a thermosetting polymer. Examples of useful thermosetting polymers include, but are not limited to, epoxy, bismaleimides, polyetheramides, benzoxazine, thermosetting polyimides (PI), polyether amide resin (PEAR), phenolic resins, epoxy-based vinyl ester resins, polycyanate resins and cyanate ester resins. In one exemplary embodiment, a vinyl ester resin is used in the binding matrix. Another embodiment includes the use of an epoxy resin, such as an epoxy resin that is a reaction product of epichlorohydrin and bisphenol A, bisphenol A diglycidyl ether (DGEBA). Curing agents (e.g., hardeners) for epoxy resins may be selected according to the desired properties of the fiber-reinforced composite strength member and the processing method. For example, curing agents may be selected from aliphatic polyamines, polyamides and modified versions of these compounds. Anhydrides and isocyanates may also be used as curing agents. Other examples of thermosetting polymeric materials useful for a binding matrix may include addition cured phenolic resins, polyetheram ides, and various anhydrides, or imides.

The binding matrix may also be a metallic matrix, such as an aluminum matrix. One example of an aluminum matrix fiber-reinforced composite is illustrated in U.S. Pat. No. 6,245,425 by McCullough et al., noted above.

When the strength member includes a galvanic layer, the galvanic layer may also be formed from reinforcing fibers, e.g., glass fibers, in a binding matrix. Alternatively, the galvanic layer may be formed from a plastic, e.g., a thermoplastic having high temperature resistance and good dielectric properties to insulate the underlying carbon fibers from the aluminum layers.

One configuration of a composite strength member for an overhead electrical cable that is particularly advantageous is the ACCC® composite configuration that is available from CTC Global Corporation of Irvine, Calif. and is illustrated in U.S. Pat. No. 7,368,162 by Hiel et al., noted above. In the commercial embodiment of the ACCC® electrical cable, the strength member is a single element strength member of substantially circular cross-section that includes a core of substantially continuous reinforcing carbon fibers disposed in a polymer matrix. The core of carbon fibers is surrounded by a robust insulating layer of glass fibers that are also disposed in a polymer matrix and are selected to insulate the carbon fibers from the surrounding conductive aluminum strands. See FIG. 1A. The glass fibers also have a higher elastic modulus than the carbon fibers and provide bendability so that the strength member and the electrical cable can be wrapped upon a spool for storage and transportation.

A desire has been expressed for overhead electrical cables that incorporate optical fibers, either for interrogation (e.g., inspection) of the cable during and/or after installation, or for telecommunications (e.g., data transmission). For overhead electrical cables that include a fiber-reinforced composite strength member, such as those described above, there is a desire to interrogate the cable after installation to ensure the integrity of the cable along its length. Because of the extreme lengths of these cables, it would also be desirable to identify the location of any anomalies, e.g., defects or fractures, identified by the interrogation, such as by using optical time domain reflectometry (OTDR), Brillouin optical time domain reflectometry (BOTDR) or similar analysis techniques. See, for example, PCT Publication No. WO2020/181248 by Wong et al., which is incorporated herein by reference in its entirety.

The present disclosure is directed to configurations that include the placement of one or more optical fibers, e.g., glass optical fibers, within the structure of the overhead electrical cable. More particularly, the configurations include strength member assemblies that include at least one optical fiber that is operatively coupled to the strength member, e.g., on an outer surface of one or more of the strength elements. It is an objective to disclose configurations of strength member assemblies and of overhead electrical cables that maintain the integrity of the optical fibers, e.g., that prevent or minimize damage to the optical fibers during manufacture and in use. It is also an objective to disclose configurations of strength member assemblies and of overhead electrical cables that enable the optical fiber(s) to be readily located at one or both ends of the overhead electrical cable, and to be at least partially separated from the overhead electrical cable at the end, so that a light transmission device (e.g., a coherent light transmission device such as a laser) and/or detection device may be operatively attached to the optical fiber(s).

Figure 2:
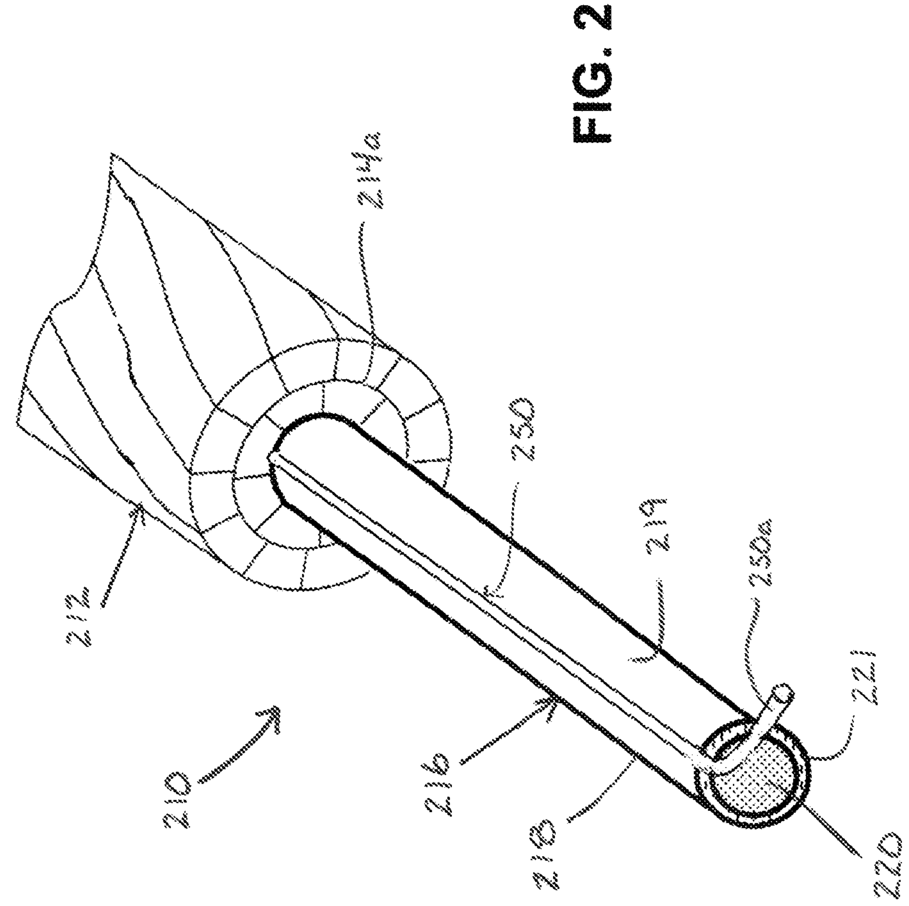
FIGS. 2-20 illustrate various embodiments of a strength member assembly having an optical fiber coupled to a strength member and an electrical cable incorporating a strength member assembly according to the present disclosure.

FIG. 2 illustrates a perspective view of an embodiment of an overhead electrical cable 210. The cable 210 includes a strength member assembly 216 including a strength member 218 that includes a single strength element 219, i.e., the strength element 219 is the strength member 218. The strength element comprises a high tensile strength fiber-reinforced composite core 220 including carbon fibers and a galvanic layer 221 of glass fibers in a binding matrix. An electrical conductor 212 surrounds the strength member assembly 216 and includes a first conductive layer 214*a* and a second conductive layer 214*b*.

In the embodiment illustrated in FIG. 2, the strength member assembly 216 includes an optical fiber 250 that is linearly disposed along an outer surface of the strength element 219, e.g., the optical fiber 250 is placed parallel to a central axis of the strength element 219. The optical fiber 250 is disposed directly on the strength element 220 (i.e., with no material layer therebetween) and is in direct contact with the conductive layer 214*a* (i.e., with no material layer therebetween). As illustrated in FIG. 2, an end portion 250*a* of the optical fiber is separated from the strength element 220, e.g., for connection to an interrogation device.

It is noted that in FIG. 2 and in the figures that follow, the optical fiber is not shown to scale relative to the electrical cable for purposes of illustration.

Figure 3:
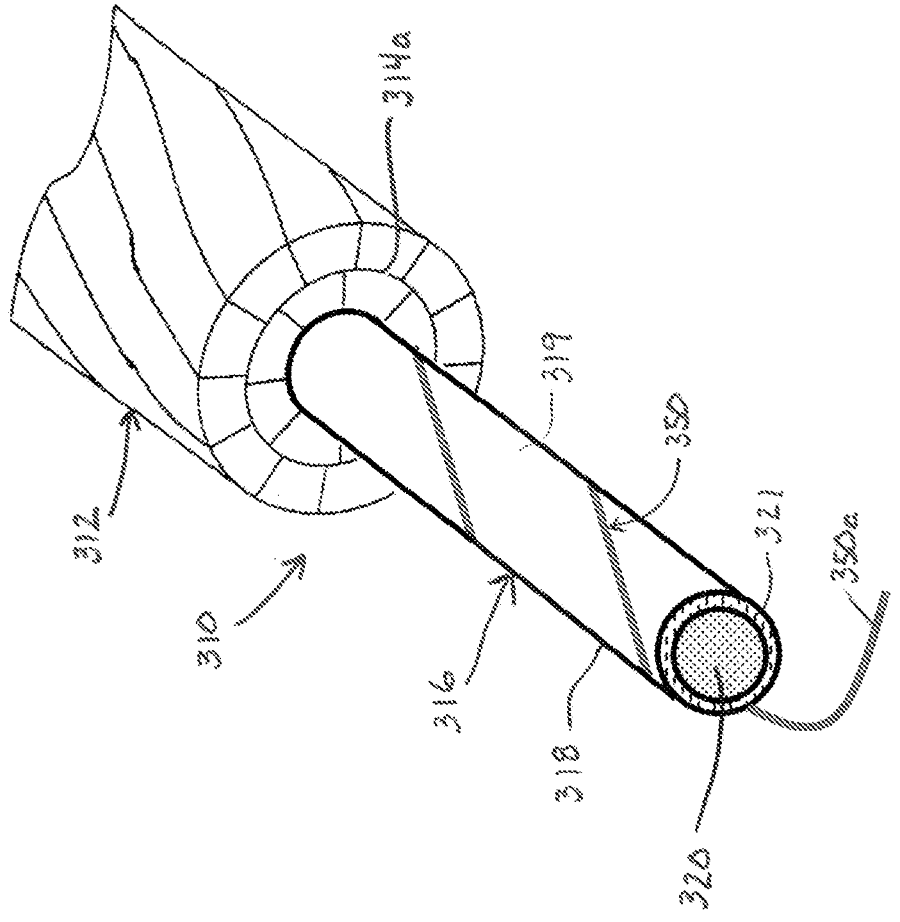

FIG. 3 illustrates a perspective view of another embodiment of an overhead electrical cable 310 and strength member assembly 316. The electrical cable 310 includes a strength member assembly 316 including a strength member 318 consisting of a single strength element 319. The strength element 319 comprises a high tensile strength fiber-reinforced composite core 320 including carbon fibers in binding matrix and a galvanic layer 321 of glass fibers in a binding matrix. An electrical conductor 312 surrounds the strength member assembly 316 and includes a first conductive layer 314*a* and a second conductive layer 314*b*. In the embodiment illustrated in FIG. 3, the optical fiber 350 is not linearly disposed along an outer surface of the strength element 319, as is illustrated in FIG. 2, but is helically wrapped around the strength element 319 to form the strength member assembly 316. As compared to disposing the optical fiber linearly along the strength element, wrapping (e.g., winding) the optical fiber 350 onto the strength element 319 may facilitate ease of manufacture and may also enhance the interrogation capability of the optical fiber 350, and may reduce the strain on the optical fiber 350 when the strength member is tensioned, thereby increasing the expected useful life of the optical fiber 350.

A disadvantage of the overhead electrical cables and strength member assemblies illustrated in FIG. 2 and FIG. 3 is that the glass optical fiber, which is relatively fragile, is subjected to high levels of stress during manufacture and use of the electrical cable due to its direct contact with the strength element and the inner conductive layer.

Figure 4:
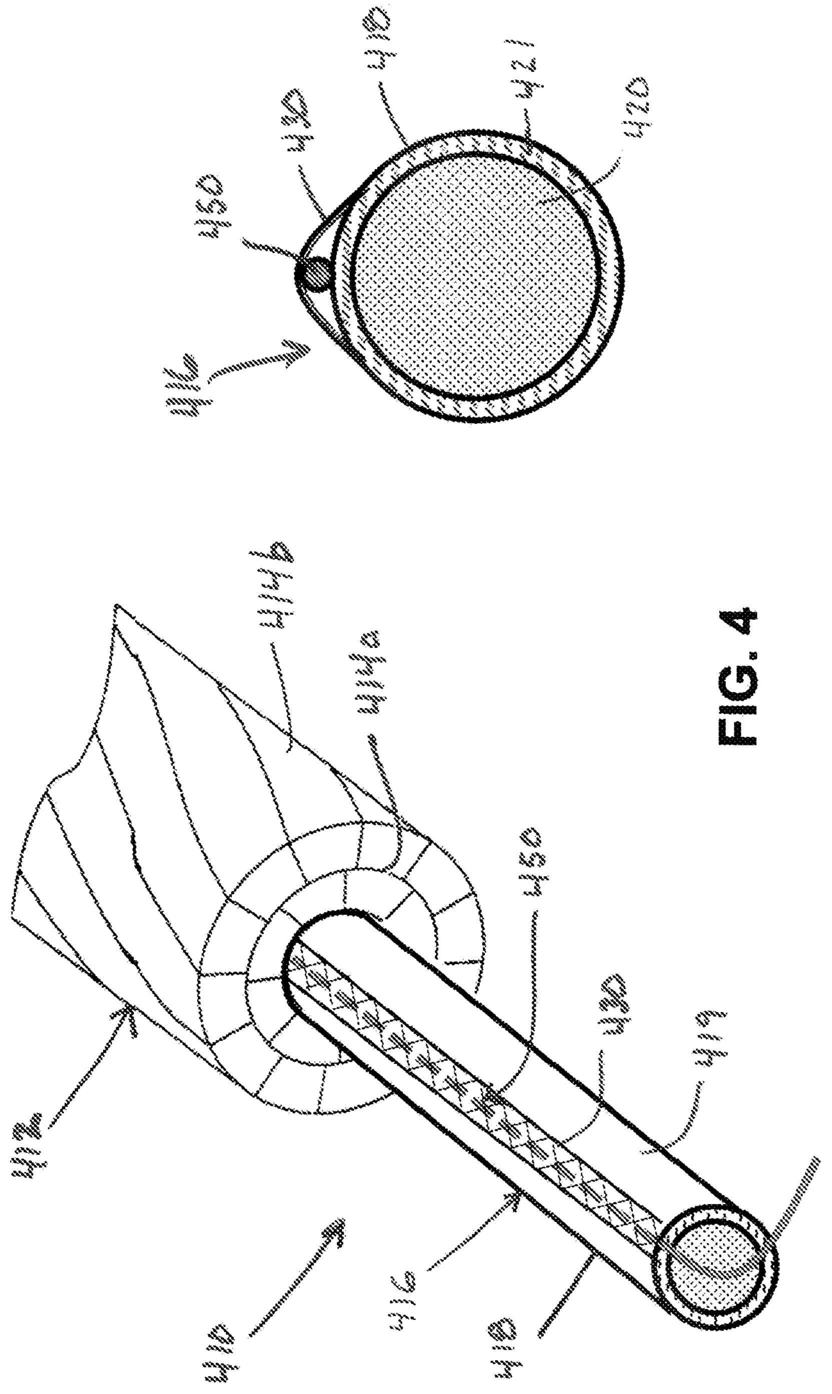

FIG. 4 illustrates a perspective view of an embodiment of an overhead electrical cable 410 and a cross-sectional view of the strength member assembly 416 according to the present disclosure. The electrical cable 410 includes a strength member assembly 416 comprising a strength member 418 that consists of a single strength element 419. The strength element 419 comprises a high tensile strength fiber-reinforced composite core 420 including carbon fibers in a binding matrix and a galvanic layer 424 of glass fibers in a binding matrix. An electrical conductor 412 surrounds the strength member assembly 416 and includes a first conductive layer 414*a* and a second conductive layer 414*b*. In the embodiment illustrated in FIG. 4, the optical fiber 450 is linearly disposed along an outer surface of the strength element 418. A tape layer 430 is placed over the optical fiber 450 along the length of the optical fiber 450. Specifically, the tape layer 430 is placed directly over and parallel with the optical fiber 450 so that the tape layer 430 lies between the optical fiber 450 and the conductive layer 414*a* along the length of the electrical cable 410.

Figure 5:
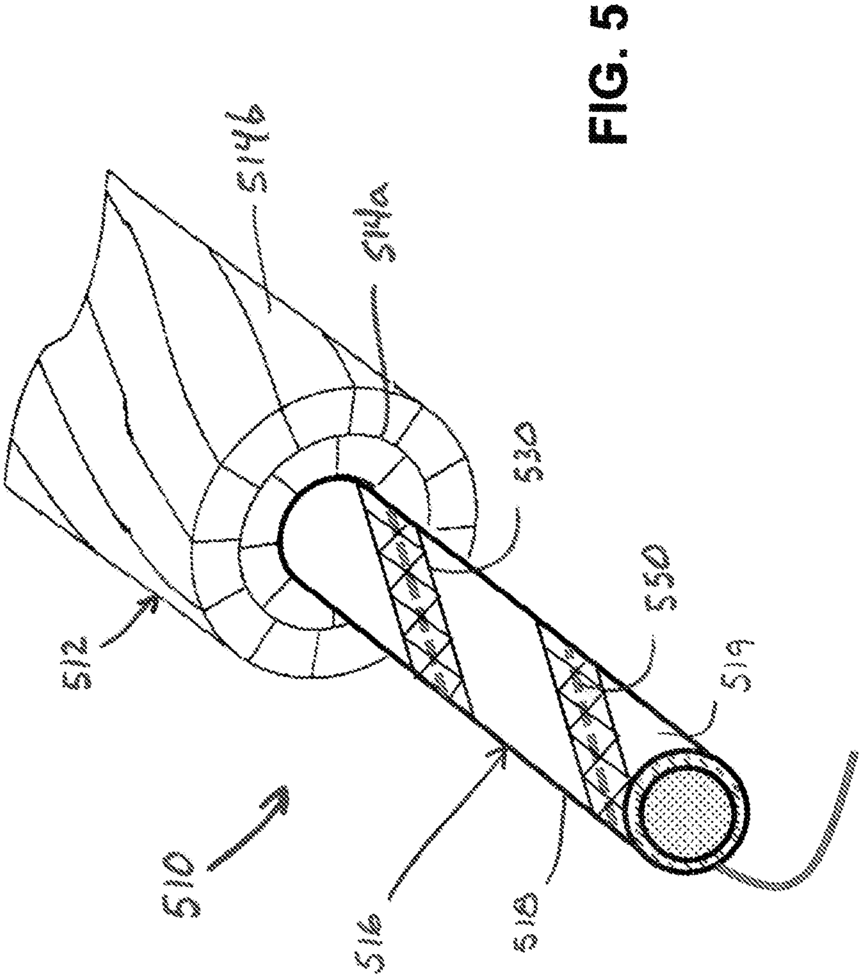

FIG. 5 illustrates a perspective view of another embodiment of an overhead electrical cable 510 according to the present disclosure. The cable 510 includes a strength member 518 that includes a single strength element 519, e.g., as illustrated in FIG. 4. An electrical conductor 512 surrounds the strength element 520 and includes a first conductive layer 514*a* and a second conductive layer 514*b*. In the embodiment illustrated in FIG. 5, the optical fiber 550 is helically wrapped around the strength element 519. The optical fiber 550 is disposed directly on the strength element 519 and a helically wound tape layer 530 is placed over the optical fiber 550 along the length of the optical fiber to form the strength member assembly 516. Specifically, the tape layer 530 is placed directly over the optical fiber 550 so that the tape layer 530 lies between the optical fiber 550 and the conductive layer 514*a* along the length of the electrical cable 510.

In the embodiments illustrated in FIG. 4 and FIG. 5, the tape layer may comprise a pressure-sensitive adhesive (PSA) on a backing material, for example. In one construction, the tape layer is constructed from a heat-resistant meta-aramid fiber, such as NOMEX tape (DuPont de Nemours, Inc., Wilmington, DE, USA), e.g., a substrate of aramid fiber having an adhesive on one surface of the substrate. The tape layer may have a thickness that is sufficient to protect the optical fiber from substantial damage. For example, the tape layer may have a thickness of at least about 0.05 mm, such as at least about 0.1 mm, and not greater than about 3 mm, such as not greater than about 2 mm.

Figure 6:
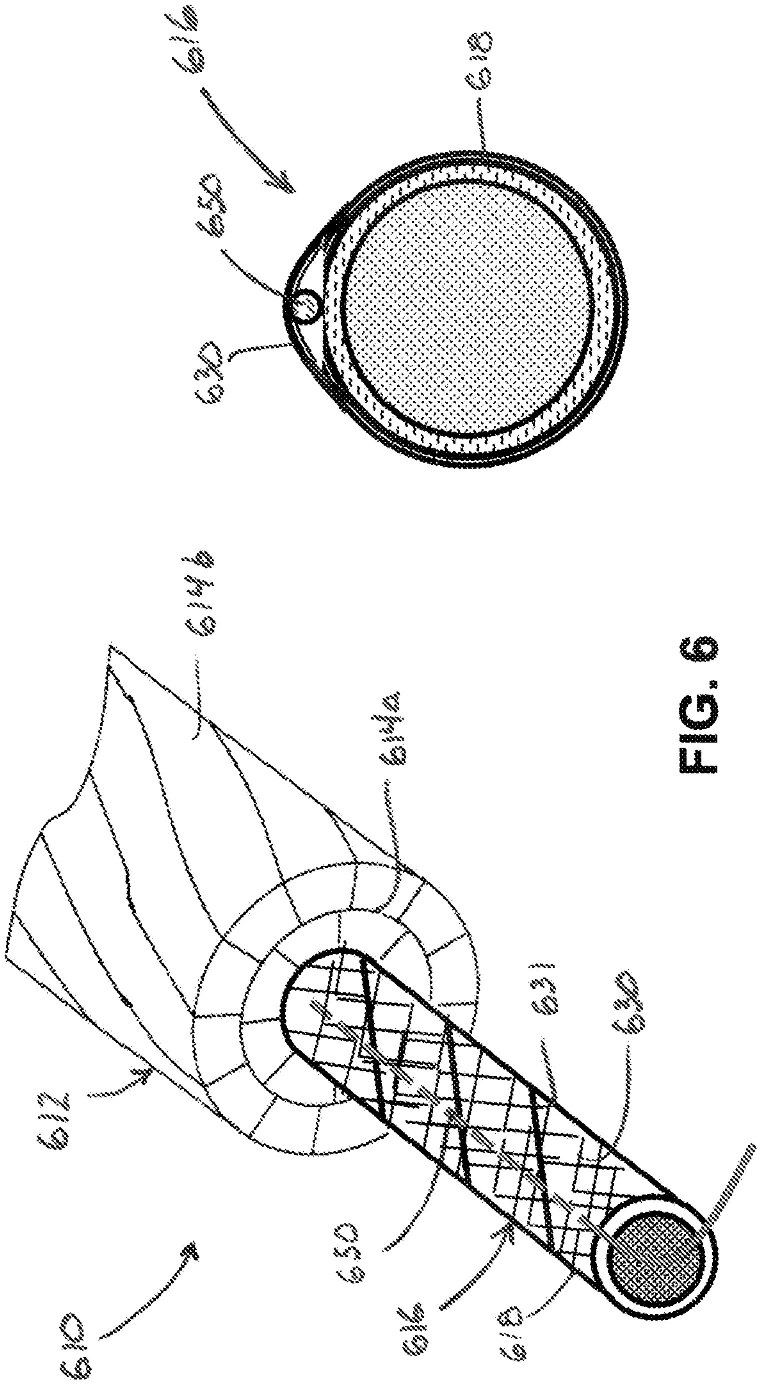

FIG. 6 illustrates a perspective view of another embodiment of an overhead electrical cable 610 and a cross-sectional view of the strength member assembly 616 according to the present disclosure. The cable 610 includes a strength member 618 that includes a high tensile strength fiber-reinforced composite core including carbon fibers and a galvanic layer of glass fibers in a binding matrix. An electrical conductor 612 surrounds the strength member 618 and includes a first conductive layer 614*a* and a second conductive layer 614*b*. In the embodiment illustrated in FIG. 6, the strength member assembly 616 includes an optical fiber 650 that is linearly disposed along an outer surface of the strength member 618. A tape layer 630 is helically wound around the strength member 618 and the optical fiber 650 to form the strength member assembly 616. Specifically, the tape layer 630 comprises a strip of tape that is helically wound around the strength element 620 in a manner such that the tape overlaps upon itself along seams 632 such that the tape layer 630 covers the entire strength member (e.g., with no substantial gaps) and the optical fiber, and such that the tape layer 630 lies between the optical fiber 650 and the conductive layer 614*a* along its length.

Figure 7:
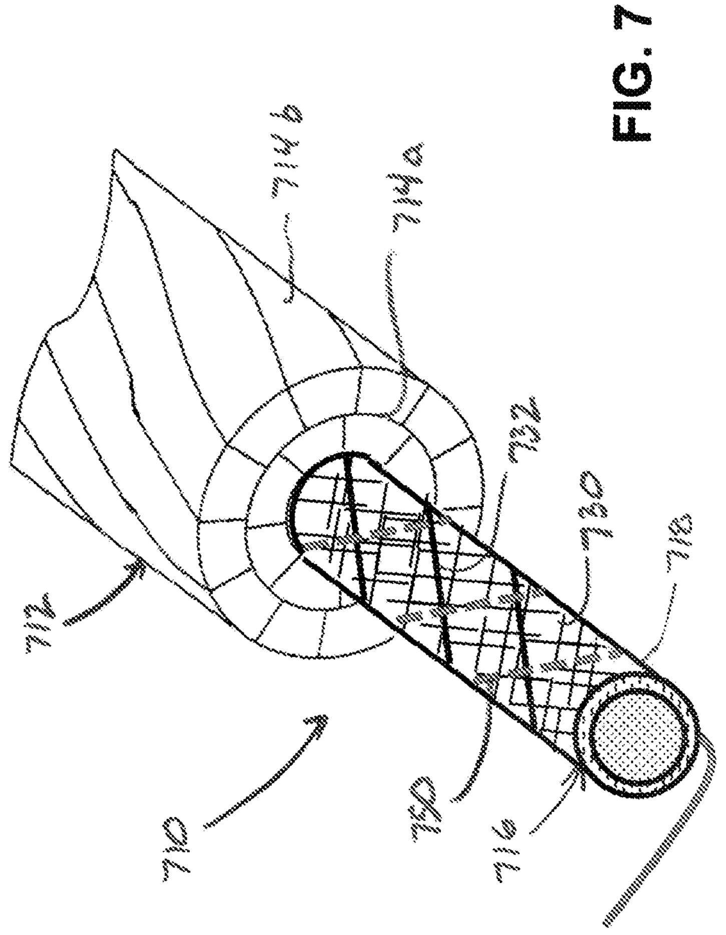

FIG. 7 illustrates a perspective view of another embodiment of an overhead electrical cable 710 according to the present disclosure. Similar to the embodiment illustrated in FIG. 6, the electrical cable 710 includes a strength member 718 (i.e., a single strength element) that comprises a high tensile strength fiber-reinforced composite core and a galvanic layer. An electrical conductor 712 surrounds the strength element 720 and includes a first conductive layer 714*a* and a second conductive layer 714*b*. In the embodiment illustrated in FIG. 7, the optical fiber 750 is helically wrapped around the strength member 718. The optical fiber 750 is disposed directly on the strength member 718 and a helically wound tape layer 730 is placed over the strength member 718 and the optical fiber 750 along the length of the optical fiber to form the strength member assembly 716. As with the embodiment illustrated in FIG. 6, the tape layer 730 comprises a strip of tape that is helically wound around the strength element 718 in a manner such that the tape overlaps itself along seams 732 and covers the entire strength member (e.g., with no substantial gaps) and the optical fiber, and such that the tape layer 730 is disposed between the optical fiber 750 and the conductive layer 714*a* along the length of the cable 710.

As with the embodiments illustrated in FIG. 4 and FIG. 5, the tape layer utilized in the embodiments of FIG. 6 and FIG. 7 may comprise a pressure-sensitive adhesive (PSA) on a backing material, for example. In one construction, the tape layer is constructed from a heat-resistant meta-aramid fiber, such as NOMEX tape (DuPont de Nemours, Inc., Wilmington, DE, USA), e.g., a substrate of aramid fiber having an adhesive on one surface of the substrate. Alternatively, because the tape layer is helically wrapped upon itself, an adhesive layer may not be necessary to secure the tape layer to the underlying support member assembly. The tape layer may have a thickness that is sufficient to protect the optical fiber from substantial damage. For example, the tape layer may have a thickness of at least about 0.05 mm, such as at least about 0.1 mm, and not greater than about 3 mm, such as not greater than about 2 mm.

Figure 8:
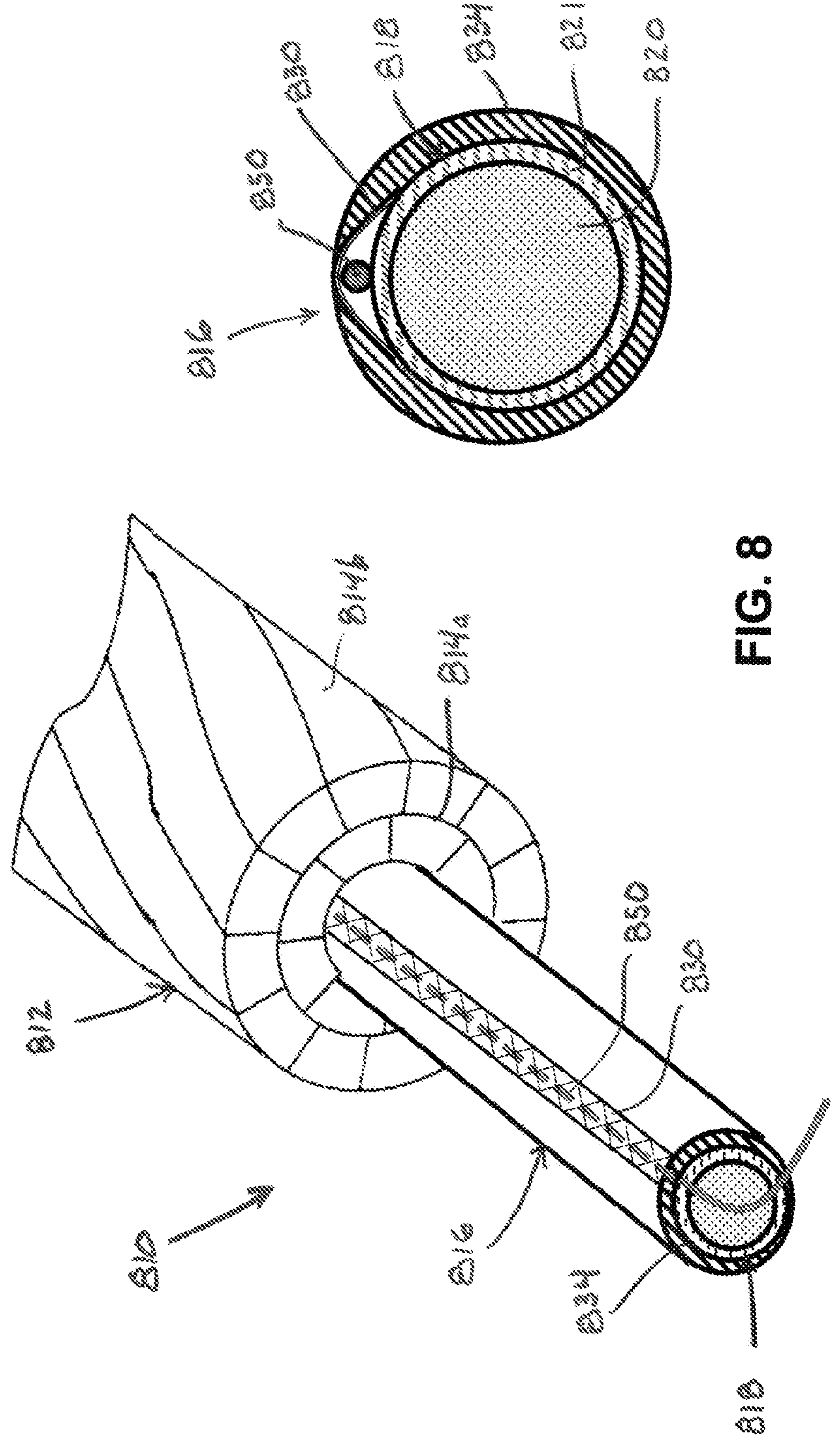

FIG. 8 illustrates a perspective view of another embodiment of an overhead electrical cable 810 and a cross-sectional view of a strength member assembly 816 according to the present disclosure. The electrical cable 810 includes a strength member 818 comprising a high tensile strength fiber-reinforced composite core 822 including carbon fibers and a galvanic layer 824 of glass fibers. An electrical conductor 812 surrounds the strength member 818 and includes a first conductive layer 814*a* and a second conductive layer 814*b*. In the embodiment illustrated in FIG. 8, the optical fiber 850 is disposed linearly along an outer surface of the strength member 818 and a tape layer 830 is placed over the optical fiber 850 along the length of the optical fiber, e.g., as illustrated in FIG. 4. In the embodiment illustrated in FIG. 8, the strength member assembly 816 includes a conformal metallic layer 834 (e.g., a metal coating) disposed over the strength member 818, the optical fiber 850 and the tape layer 830. Although not specifically illustrated, the embodiment of a strength member assembly illustrated in FIG. 8 may be modified by helically wrapping the optical fiber 850 and the tape layer 830 around the strength element 820, e.g., in a manner illustrated in FIG. 5.

The conformal metallic layer 834 illustrated in FIG. 8 may be formed from aluminum, e.g., from aluminum or an aluminum alloy, although the present disclosure is not limited to the use of aluminum. In one characterization, the thickness of the layer 834 is at least about 0.4 mm, such as at least about 0.6 mm. Typically, the thickness of the layer 834 will not exceed about 1.5 mm, such as not greater than about 1.2 mm, such as not greater than about 1.0 mm. Merely by way of example, the conformal metallic layer 834 may be disposed on the strength member assembly 816 by continuous extrusion or similar coating methods. The conformal metallic layer may also be formed using a metallic strip that is welded along its seam, e.g., as is illustrated in US Patent Publication No. 2012/0090892 by Meyer et al. which is incorporated herein by reference in its entirety.

Figure 9:
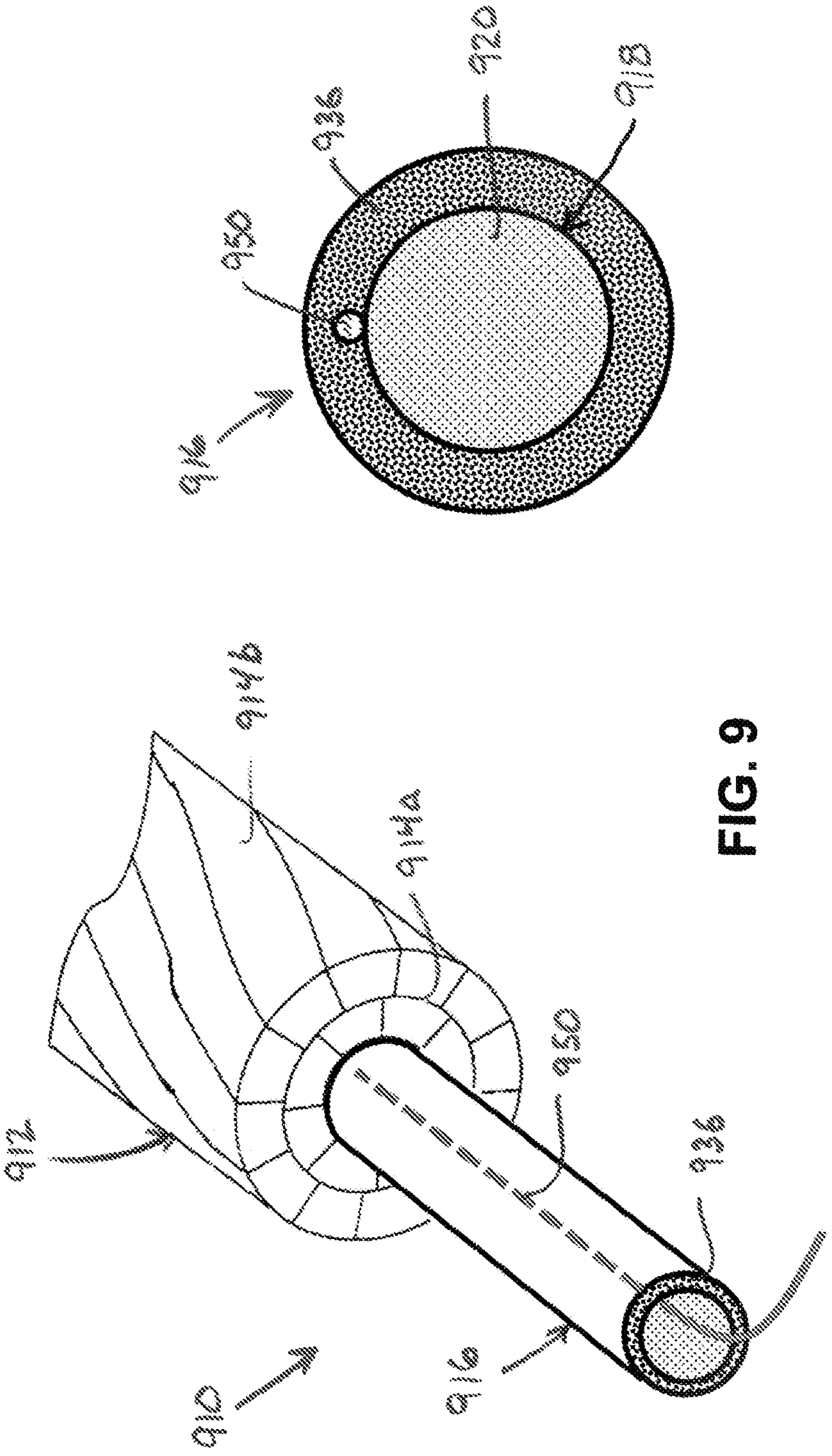

FIG. 9 illustrates a perspective view of another embodiment of an overhead electrical cable 910 and a cross-sectional view of a strength member assembly according to the present disclosure. The cable 910 includes a strength member 918 that includes a single strength element. The strength element comprises a high tensile strength fiber-reinforced composite 922 including carbon fibers disposed in a binding matrix. An electrical conductor 912 surrounds the strength member 918 and includes a first conductive layer 914*a* and a second conductive layer 914*b*. In the embodiment illustrated in FIG. 9, the optical fiber 950 is disposed linearly along an outer surface of the strength member 918 and a plastic layer 936 is disposed over the strength member 918 and the optical fiber 950 to form the strength member assembly 916. Thus, the plastic layer 936 completely surrounds and protects the optical fiber 950 and the entire circumference of the strength member 918.

Figure 10:
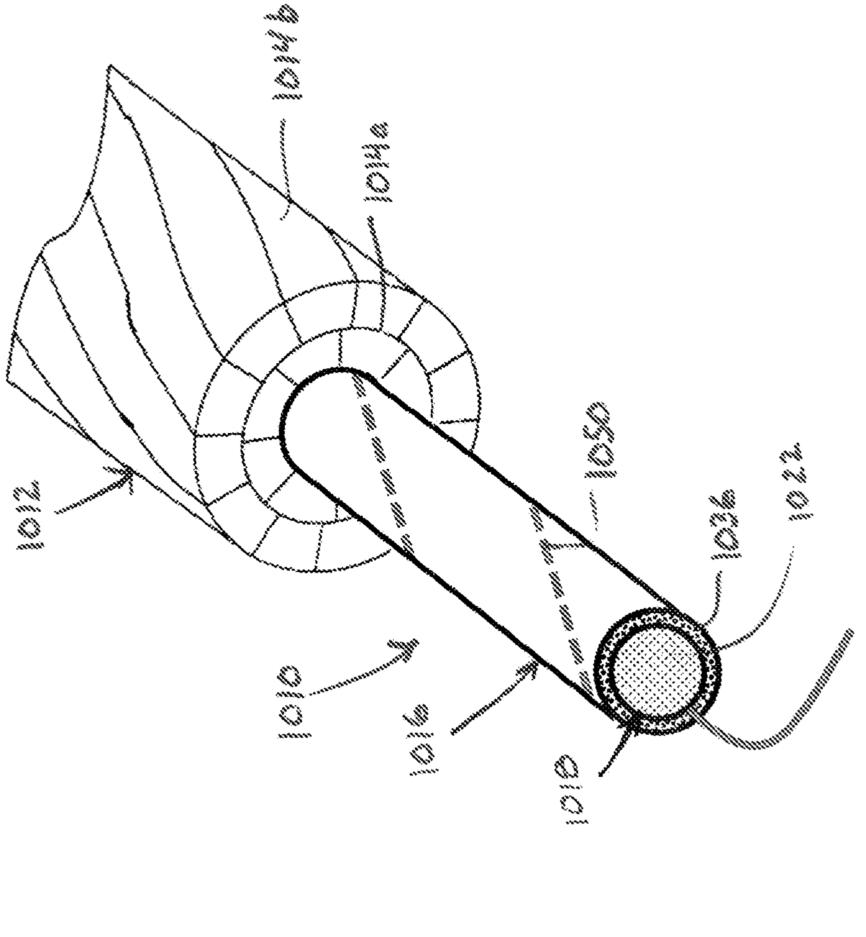

FIG. 10 illustrates a perspective view of another embodiment of an overhead electrical cable 1010 according to the present disclosure. The cable 1010 includes a strength member 1018 including a high tensile strength fiber-reinforced composite 1022 including carbon fibers in a binding matrix. An electrical conductor 1012 surrounds the strength member 1018 and includes a first conductive layer 1014*a* and a second conductive layer 1014*b*. In the embodiment illustrated in FIG. 10, the optical fiber 1050 is disposed helically along an outer surface of the strength element 1020 and a plastic layer 1036 is placed over the optical fiber 1050 and over the strength element 1020 along the length of the strength element 1020, e.g., such that the plastic layer 1036 surrounds the optical fiber and the entire circumference of the strength element.

In the embodiments illustrated in FIG. 9 and FIG. 10, the plastic layer may comprise a high-performance plastic, e.g., having a continuous service temperature of at least about 150° C., such as at least about 180° C., at least about 200° C. or even at least about 220° C. In one characterization, the high-performance plastic layer is a thermoplastic, e.g., a semi-crystalline thermoplastic. In another characterization, the high-performance plastic layer is formed from a thermoplastic selected from polyetheretherketone (PEEK) and polyphenylene sulfide (PPS). Other plastic materials such as fluorocarbon polymers, e.g., polytetrafluoroethylene, may also be useful, as well as high-performance amorphous plastics such as amorphous polyetherimide (PEI). The plastic layer may also be fabricated from an elastomer having good thermal resistance properties, such as an elastomeric silicone. The plastic layer may have a thickness of at least about 1 mm, such as at least about 2 mm. Typically, the thickness of the plastic layer will be not greater than about 10 mm.

Figure 11:
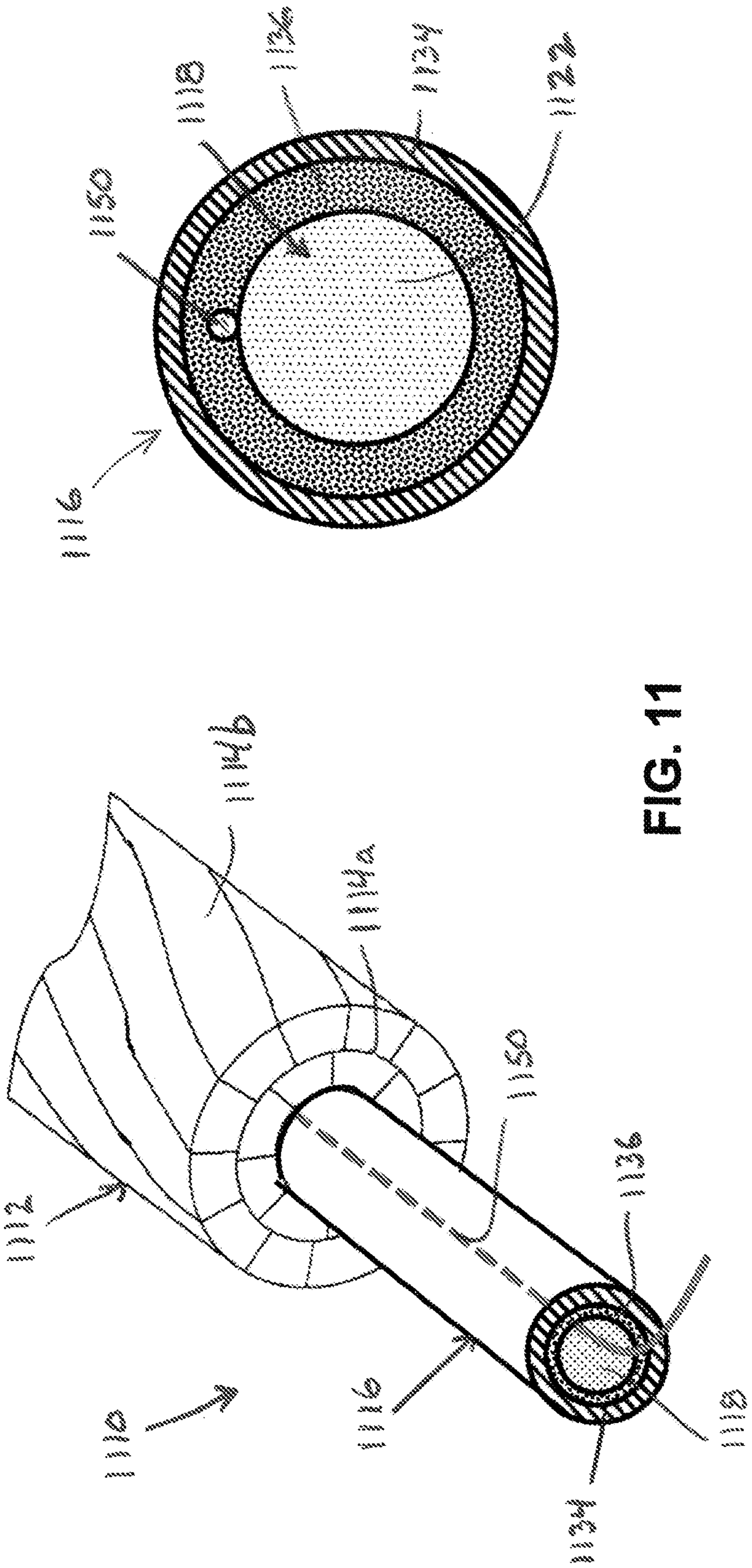

FIG. 11 illustrates a perspective view of another embodiment of an overhead electrical cable 1110 and a cross-sectional view of the strength member assembly 1116 according to the present disclosure. The electrical cable 1110 includes a strength member 1118 comprising a high tensile strength fiber-reinforced composite 1122 including carbon fibers. An electrical conductor 1112 surrounds the strength element 1120 and includes a first conductive layer 1114*a* and a second conductive layer 1114*b*. In the embodiment illustrated in FIG. 11, the optical fiber 1150 is disposed linearly along an outer surface of the strength member 1118 and a plastic layer 1136 is disposed over the optical fiber 1150 and over the strength member 1118 along the length of the strength member 1118. Thus, the plastic layer 1136 surrounds the optical fiber and the entire circumference of the strength member in a manner similar to that illustrated in FIG. 9. In the embodiment of FIG. 11, a conformal metallic layer 1134 is disposed over the plastic layer 1136, e.g., to form the strength member assembly 1116. The plastic layer 1136 may be fabricated from plastic materials such as those discussed above with respect to FIG. 9 and FIG. 10. The conformal metallic layer 1134 may be formed from aluminum, e.g., from pure aluminum or an aluminum alloy, although the present disclosure is not limited to the use of aluminum.

Figure 12:
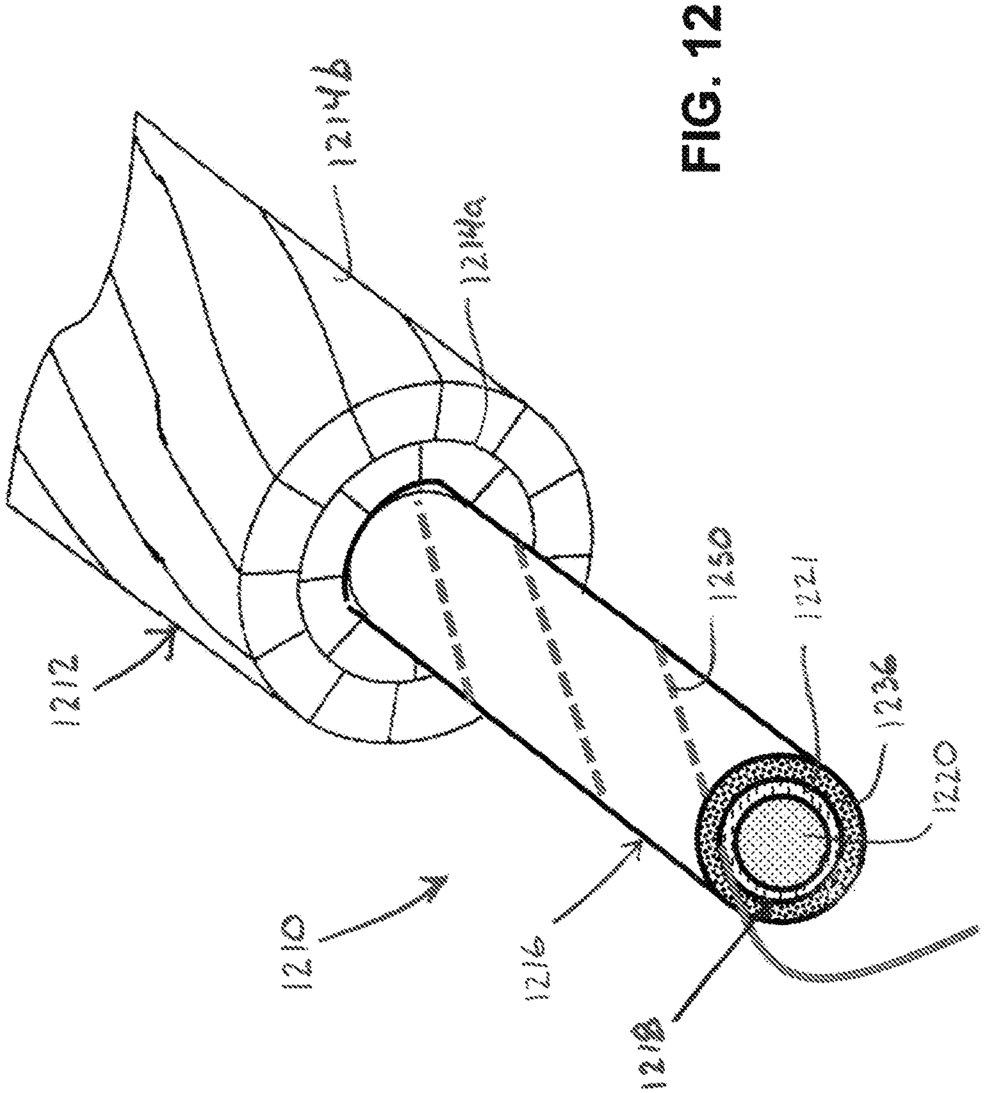

FIG. 12 illustrates a perspective view of another embodiment of an overhead electrical cable 1210 according to the present disclosure. The cable 1210 includes a strength member 1218 comprising a high tensile strength fiber-reinforced composite core 1220 including carbon fibers and a galvanic layer 1221 surrounding the core. An electrical conductor 1212 surrounds the strength member 1218 and includes a first conductive layer 1214*a* and a second conductive layer 1214*b*. In the embodiment illustrated in FIG. 12, the optical fiber 1250 is helically disposed along an outer surface of the strength element 1220 and a plastic layer 1236 is placed over the optical fiber 1250 and over the strength member 1218 along the length of the strength member 1218 to form the strength member assembly 1216. The plastic layer may be comprised of materials such as those described above with respect to FIG. 9 and FIG. 10.

Figure 13:
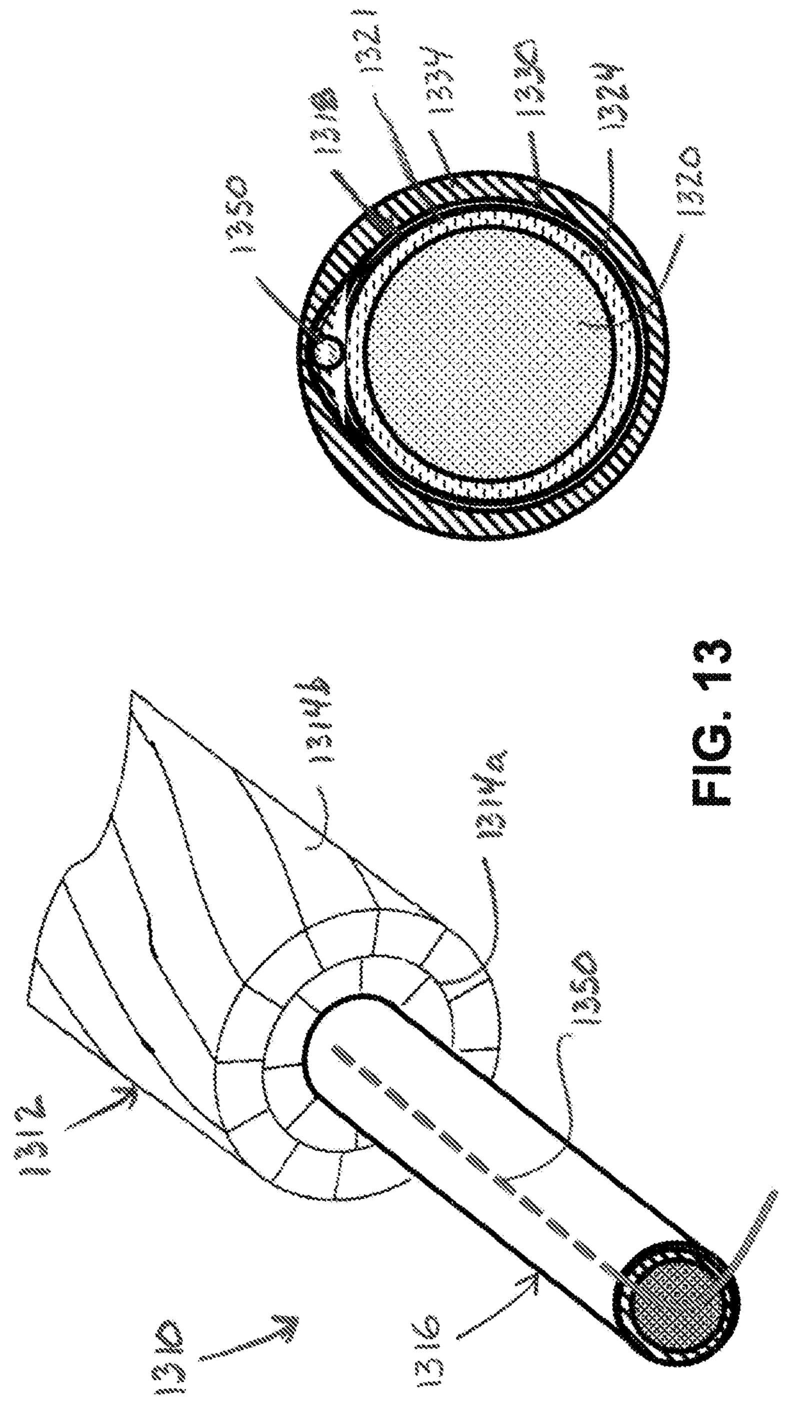

FIG. 13 illustrates a perspective view of another embodiment of an overhead electrical cable 1310 and a cross-sectional view of the strength member assembly 1316 according to the present disclosure. The cable 1310 includes a strength member 1318 comprising a high tensile strength fiber-reinforced composite core 1320 including carbon fibers in a binding matrix and a galvanic layer 1321 comprising glass fibers in a binding matrix. An electrical conductor 1312 surrounds the strength member 1318 and includes a first conductive layer 1314*a* and a second conductive layer 1314*b*. In the embodiment illustrated in FIG. 13, the optical fiber 1350 is linearly disposed along an outer surface of the strength member 1318. A tape layer 1330 is helically wound around the strength element 1320 and over the optical fiber 1350, e.g., as illustrated in FIG. 6. In this embodiment, a conformal metallic layer 1334 is disposed around the tape layer 1330 to encapsulate the entire assembly, e.g., to encapsulate the strength member 1318, the optical fiber 1350 and the tape layer 1330 to form the strength member assembly 1316. The tape layer 1330 may comprise the materials and have a thickness as described above with respect to FIGS. 4 to 7 above.

In the foregoing embodiments, particularly as illustrated in FIGS. 4-13, one or more material layers are utilized to bond the optical fiber to the strength member (e.g., to couple the optical fiber to the strength member) and to protect the optical fiber from damage during manufacture and use of the electrical cable. Although such material layers may provide a degree of protection for the optical fibers for many applications, it may be desirable or necessary to further reduce the stress and strain placed on the optical fiber that may damage the fiber.

Figure 14:
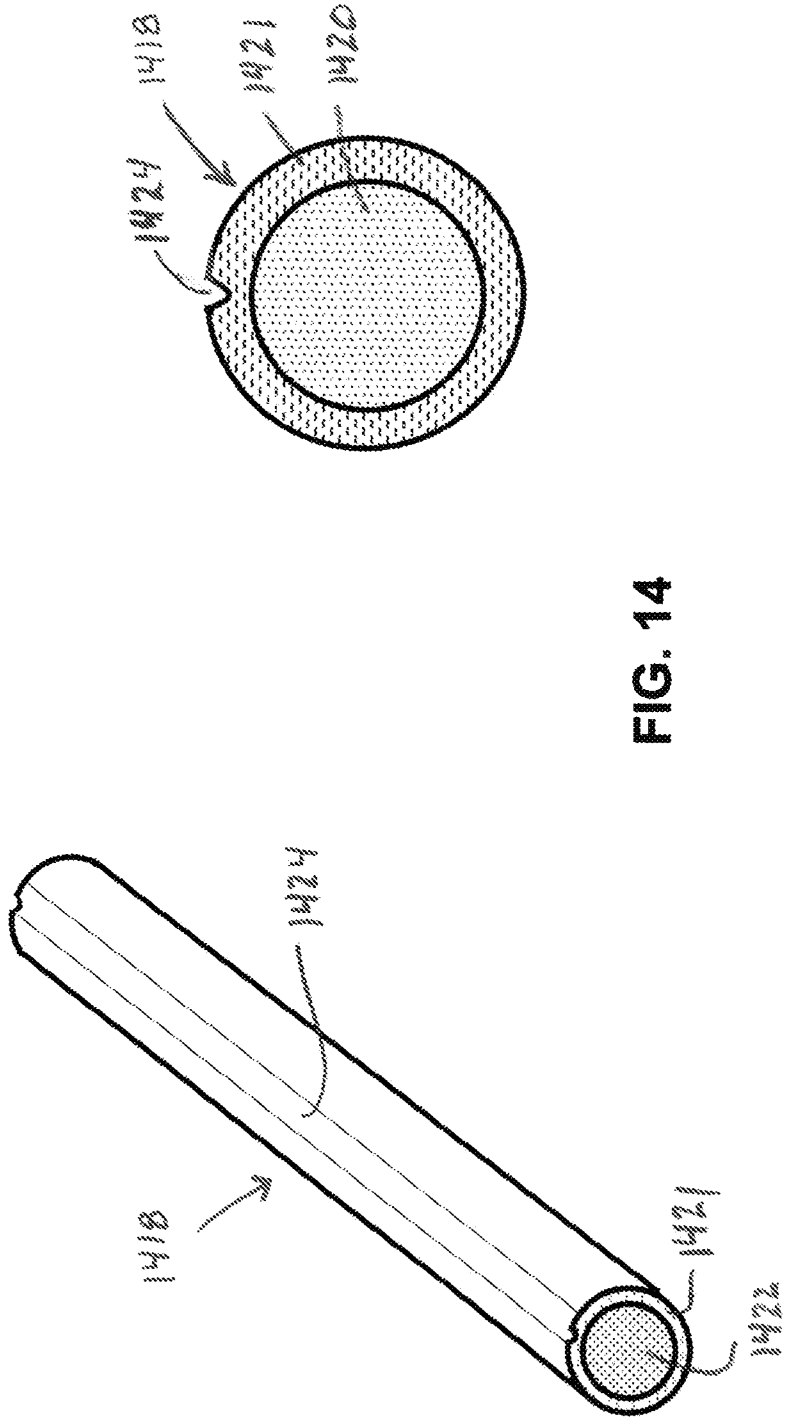
Figure 15:
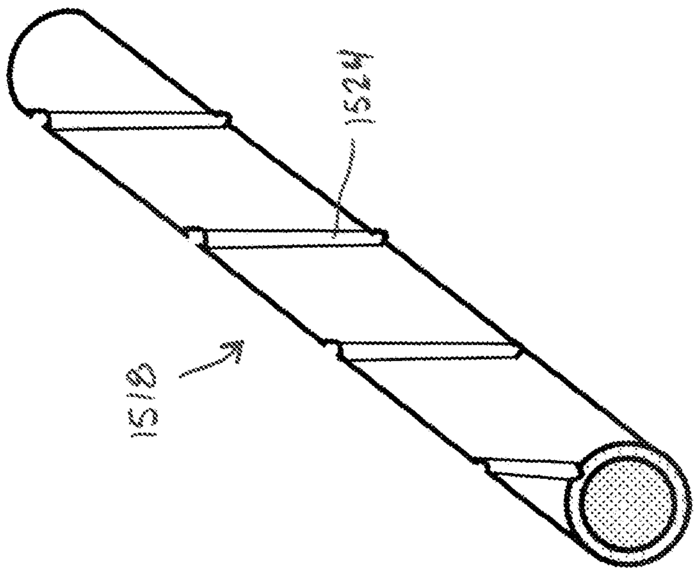

In this regard, FIG. 14 illustrates an embodiment of a strength member 1420 according to an embodiment of the present disclosure. The strength member 1418 includes a high tensile strength fiber-reinforced composite core 1422 including carbon fibers in a binding matrix and a galvanic layer 1421 comprised of glass fibers in a binding matrix. The strength element includes a groove 1424 that runs along the length of the strength member 1418. The groove 1424 is configured (e.g., sized and shaped) to retain one or more optical fibers within the groove 1424. In this manner, all or substantially all of the optical fiber(s) may be disposed in the groove 1426 without protruding substantially above the surface of the strength member 1418. FIG. 15 illustrates a strength member 1518 that includes a groove 1524 that is similar to that illustrated in FIG. 14, but where the groove is helically disposed about the strength member 1520.

In either embodiment, the width of the groove should be sufficient to enable the placement of at least one optical fiber within the groove, and the depth of the groove should be sufficient to enable the optical fiber to be disposed substantially below the surface of the strength member. In one characterization, the groove has a width that is substantially similar to, or slightly greater than, the width of the optical fiber so that the optical fiber may be friction fit within the groove. Stated another way, the optical fiber and the groove may have dimensions such that the outer circumference of the optical fiber may gently contact the sidewalls of the groove when the optical fiber is placed within the groove. A typical glass oprical fiber has an outer diameter of from about 150 μm to about 500 μm including the plastic jacket(s) that typically surrounds the glass core of the fiber. Thus, the groove may have a width of at least about 100 μm such as at least about 120 μm. However, the groove should not be larger than necessary to accommodate an optical fiber, or several optical fibers if desired, and in one construction the groove has a width of not greater than about 500 μm, such as not greater than about 400 μm. Similarly, the depth of the groove will typically have dimensions that are similar to the width. The shape of the groove may be circular (e.g., with rounded bottom and sidewalls) or may be polygonal (e.g., with squared-off sidewalls and bottom). In certain configurations, as described below, the optical fiber may have a greater width, e.g., up to about 1 mm, and in such constructions the width of the groove may be up to about 1 mm or up to about 900 μm to accommodate the larger diameter optical fiber.

Figure 16:
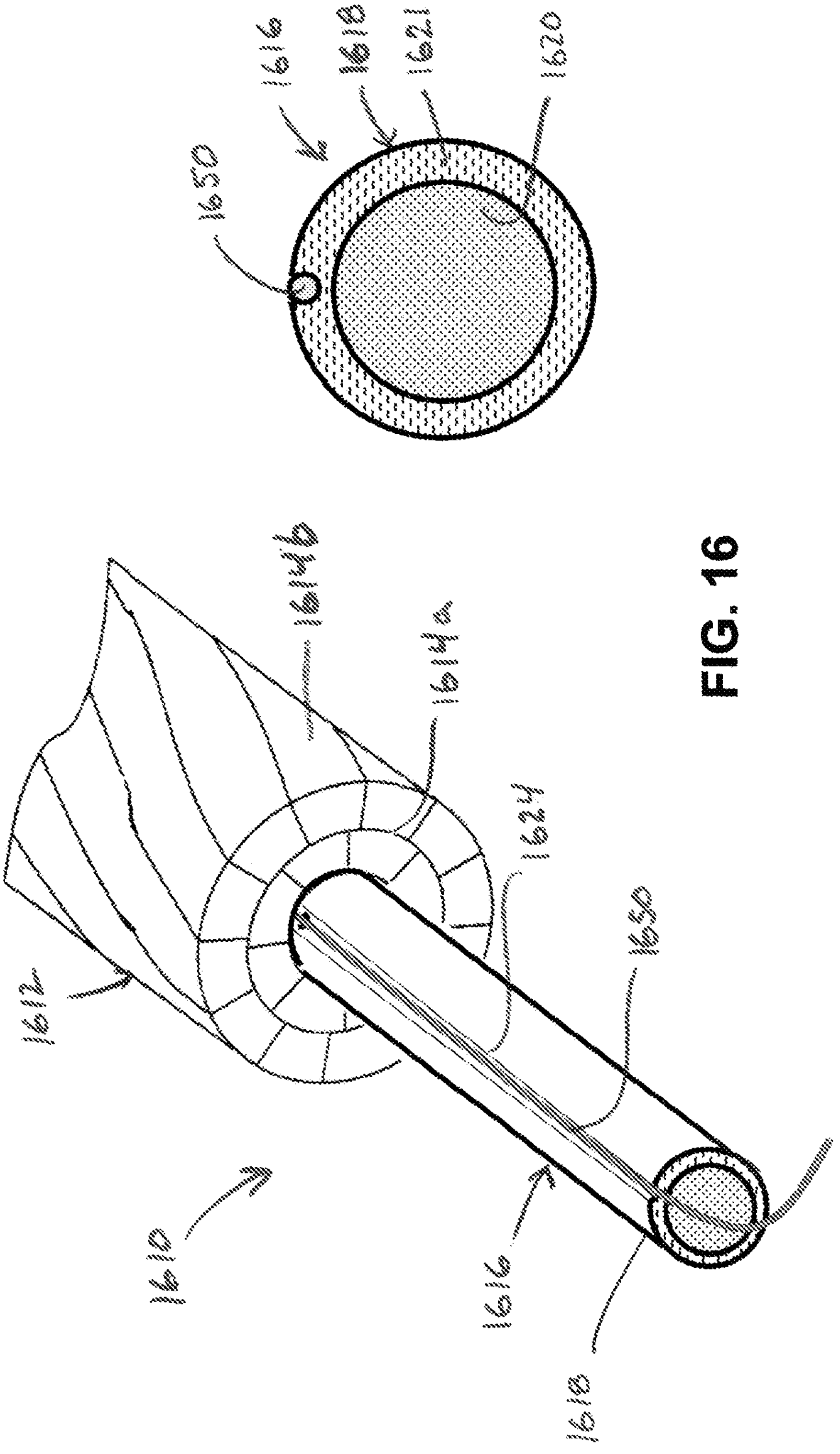

Optical fiber grooves such as those illustrated in FIGS. 14 and 15 may be implemented with any of the embodiments illustrated above, including the embodiment illustrated in FIG. 2. By way of example, FIG. 16 illustrates an embodiment of an electrical cable 1610 and a strength member assembly 1616 utilizing a strength member such as that illustrated in FIG. 14. The electrical cable 1610 includes a strength member 1618 that includes a single strength element comprising a high tensile strength fiber-reinforced composite core 1622 including carbon fibers in a binding matrix and a galvanic layer of glass fibers in a binding matrix. An electrical conductor 1612 surrounds the strength member 1620 and includes a first conductive layer 1614*a* and a second conductive layer 1614*b*. In the embodiment illustrated in FIG. 16, an optical fiber 1650 is linearly disposed in a groove 1624 that is formed along an outer surface of the strength member 1618 to form the strength member assembly 1616. In this manner, although the optical fiber 1650 is disposed on the surface of the strength member 1618 with no intervening material layer between the optical fiber 1650 and the conductive layer 1614*a*, the groove 1624 substantially prevents the optical fiber from being significantly damaged when, for example, the conductive layer 1614*a* is stranded over the strength member 1618. A similar strength member assembly configuration to that illustrated in FIG. 16 may be implemented with a helically coupled optical fiber, e.g., using the strength member illustrated in FIG. 15. In one implementation, the optical fiber is bonded within the groove using an adhesive or similar material, particularly a high temperature adhesive. For example, a high temperature epoxy may be used. Similarly, a thermoplastic or a polyamide may be used to secure the optical fiber within the groove.

Figure 17:
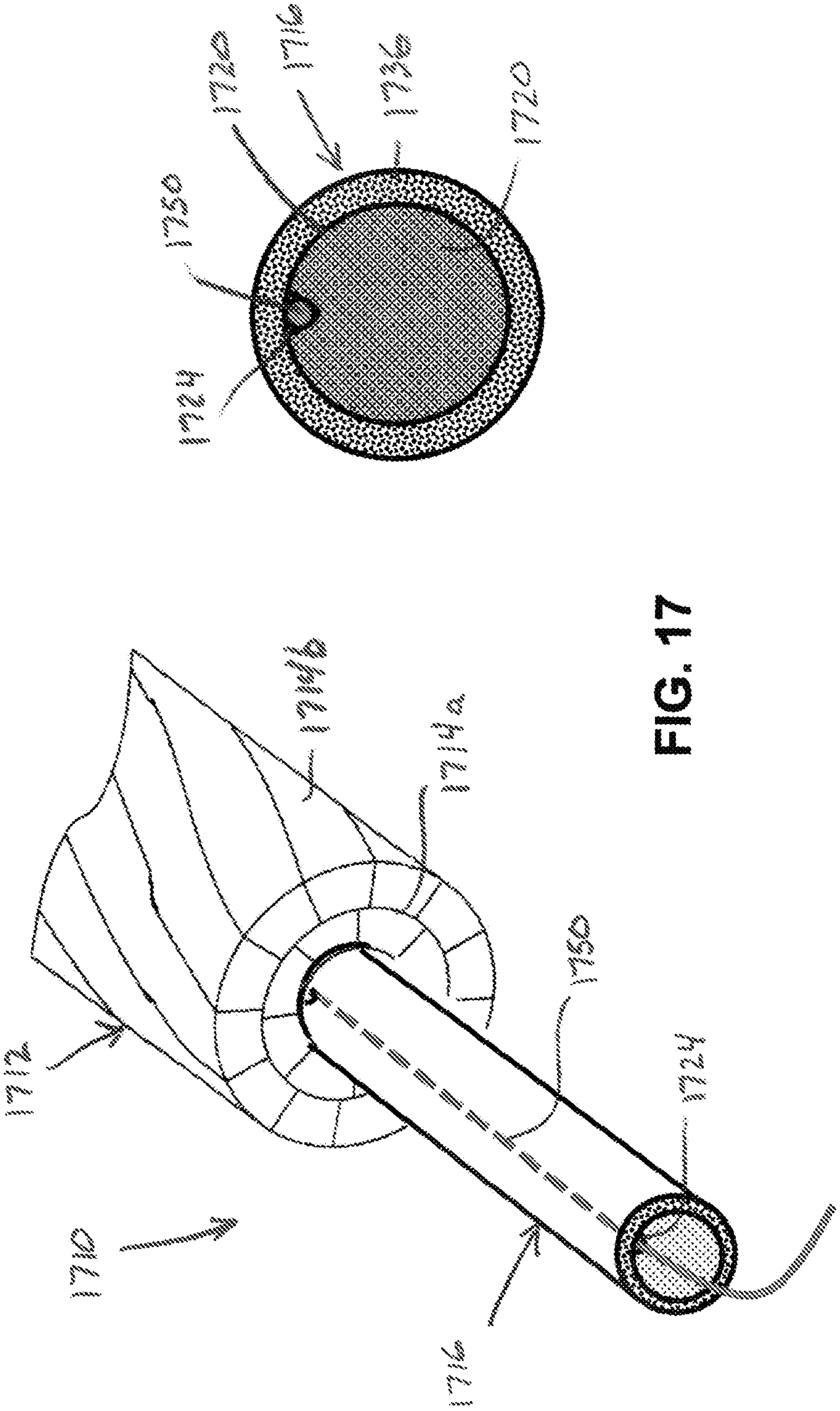

Although disposing the optical fiber in a groove as illustrated in FIG. 16 may provide some protection for the optical fiber, it may still be desirable or necessary to provide additional material layer to further protect the optical fiber, e.g., using layers and combinations of layers as illustrated in FIGS. 4-13 above. Merely by way of example, FIG. 17 illustrates a perspective view of an electrical cable 1710 and a cross-sectional view of a strength member assembly 1716 including strength member 1718 and an optical fiber 1750 disposed in a groove 1724. The strength member 1718 comprises a high tensile strength fiber-reinforced composite core 1720 including carbon fibers in a binding matrix. An electrical conductor 1712 surrounds the strength member 1720 and includes a first conductive layer 1714*a* and a second conductive layer 1714*b*. In the embodiment illustrated in FIG. 17, an optical fiber 1750 is linearly disposed in a groove 1724 that is formed along an outer surface of the strength element 1720. A plastic layer 1736 is disposed over and surrounds the strength element 1718 and the optical fiber 1750 to form the strength member assembly 1716. The plastic layer 1736 may be formed from the materials and have the dimensions as described above with respect to FIG. 9 and FIG. 10.

Figure 18:
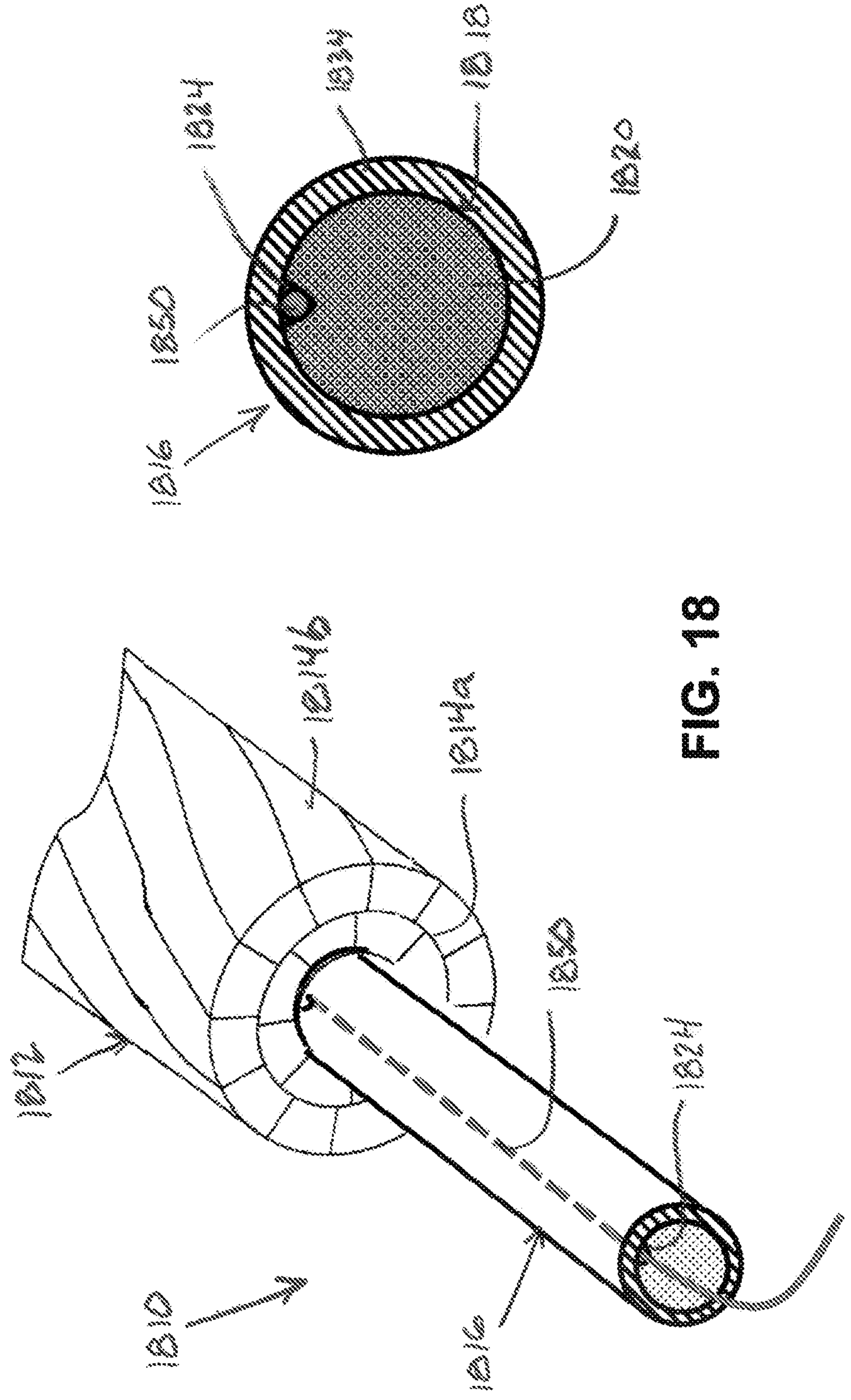

As another example, FIG. 18 illustrates a perspective view of an electrical cable 1810 and a cross-sectional view of a strength member assembly 1816 including strength member 1820 and an optical fiber 1850 disposed in a groove 1826. The strength member 1818 comprises a high tensile strength fiber-reinforced composite core 1820 including carbon fibers in a binding matrix. An electrical conductor 1812 surrounds the strength member 1818 and includes a first conductive layer 1814*a* and a second conductive layer 1814*b*. In the embodiment illustrated in FIG. 18, an optical fiber 1850 is linearly disposed in a groove 1824 that is formed along an outer surface of the strength member 1818. A metallic conformal layer 1834 is disposed over and surrounds the strength member 1818 and the optical fiber 1850 to form the strength member assembly 1816.

Figure 19:
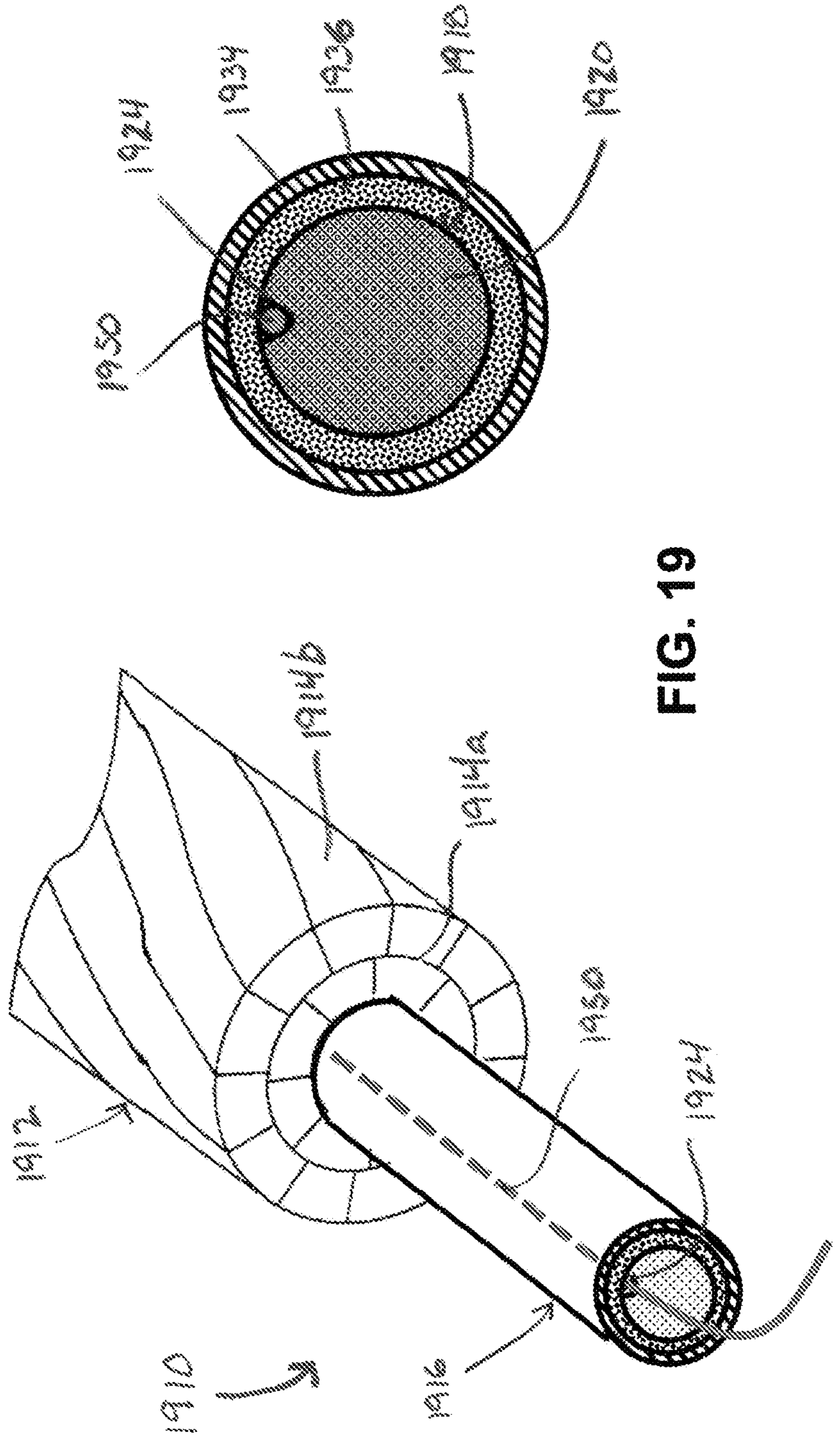

FIG. 19 illustrates a perspective view of an electrical cable 1910 and a cross-sectional view of a strength member assembly including strength member 1918 and an optical fiber 1950 disposed in a groove 1924. The strength element comprises a high tensile strength fiber-reinforced composite 1920 including carbon fibers including carbon fibers in a binding matrix. An electrical conductor 1912 surrounds the strength member 1920 and includes a first conductive layer 1914*a* and a second conductive layer 1914*b*. In the embodiment illustrated in FIG. 19, an optical fiber 1950 is linearly disposed in a groove 1924 that is formed along an outer surface of the strength element 1920. A plastic layer 1936 is disposed over and surrounds the strength member 1918 and the optical fiber 1950. A metallic conformal layer 1934 is disposed over and surrounds the plastic layer 1936 to form the strength member assembly 1916.

Figure 20:
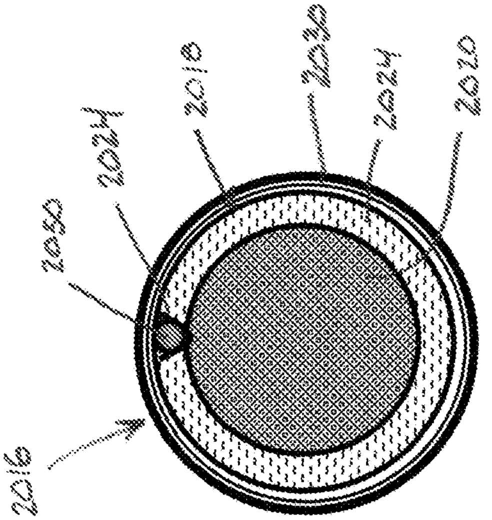
Figure 20:
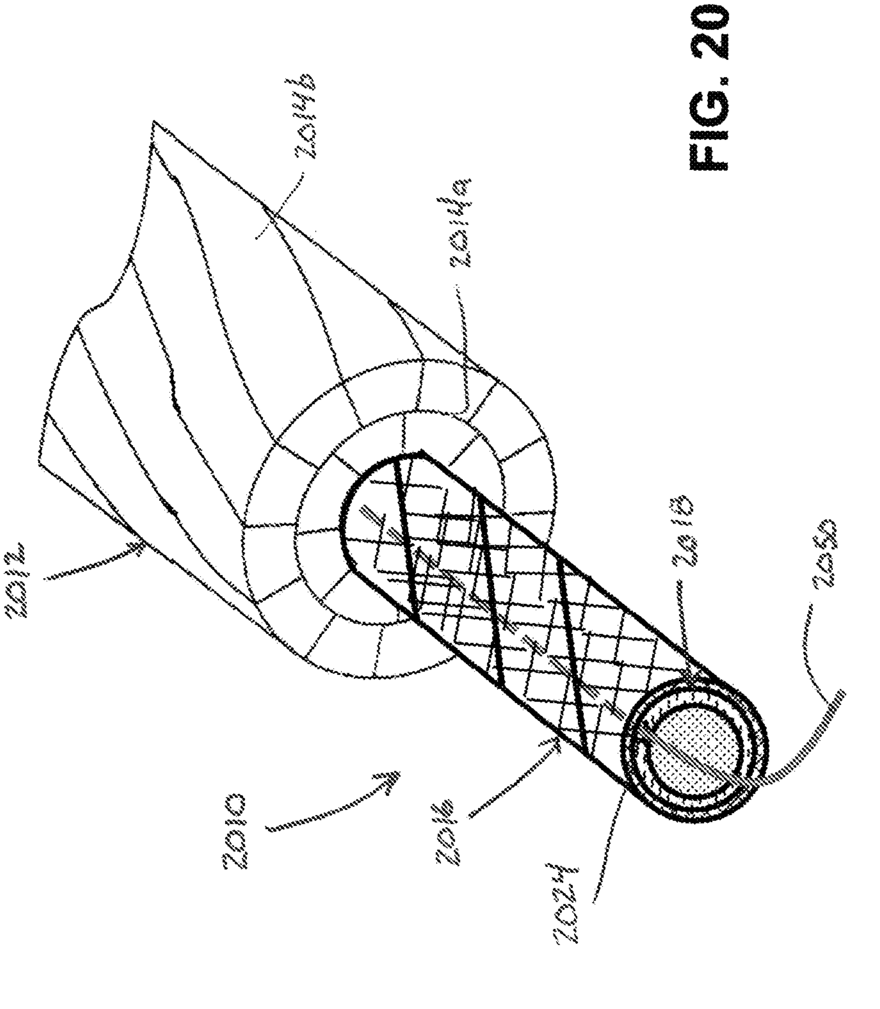

FIG. 20 illustrates a perspective view of another embodiment of an electrical cable 2010 and a cross-sectional view of a strength member assembly 2016 that includes a strength member 2018 and an optical fiber 2050 disposed in a groove 2024. The strength element comprises a high tensile strength fiber-reinforced composite core 2022 including carbon fibers and a galvanic layer 2024 surrounding the composite 2022. An electrical conductor 2012 surrounds the strength member 2018 and includes a first conductive layer 2014*a* and a second conductive layer 2014*b*. In the embodiment illustrated in FIG. 20, an optical fiber 2050 is linearly disposed in a groove 2024 that is formed along an outer surface of the strength member 2018. A tape layer 2030 is helically wrapped around and surrounds the strength member 2018 and the optical fiber 2050 to form the strength member assembly 2016. The tape layer 2030 may be formed from materials and have the dimensions similar to those disclosed above with respect to FIG.

In any of the foregoing embodiments incorporating a groove in the strength member, the optical fiber(s) may be tightly fit, e.g., friction fit, within the groove by careful selection of the groove width relative to the diameter of the optical fiber. Alternatively, or in addition, the optical fiber may be secured in the groove using means such as an adhesive (e.g., a flowable adhesive or an adhesive tape).

Figure 21A:
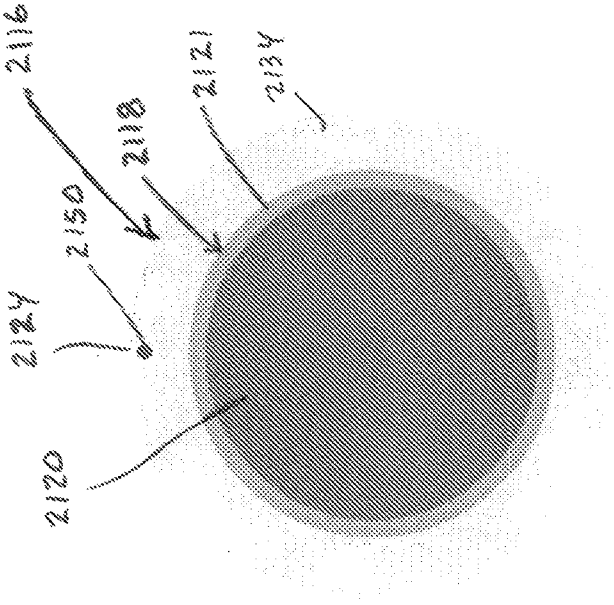
FIGS. 21A-21C illustrate cross-sectional views of a strength member assembly according to an embodiment of the present disclosure.
Figure 21B:
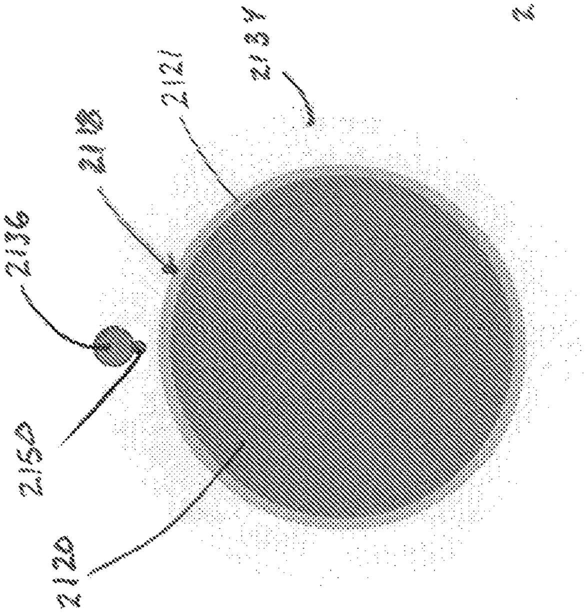
Figure 21C:
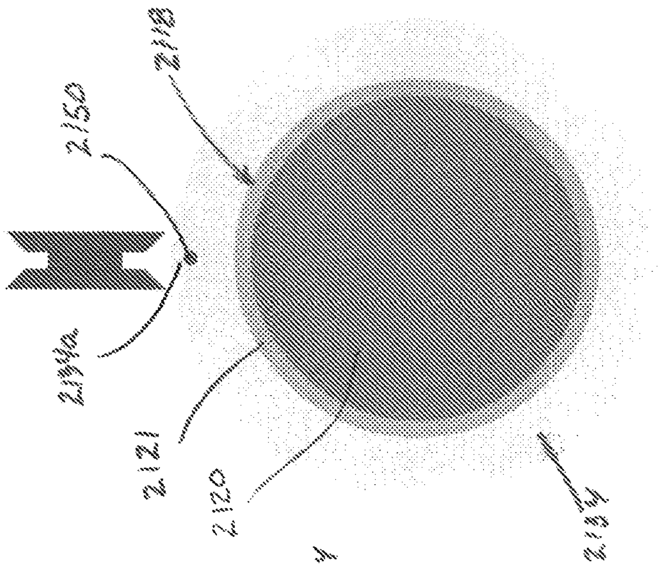

In another embodiment, the strength member assembly includes optical fiber(s) are operatively coupled to the strength member by being bonded to the conformal metallic layer, e.g., onto or beneath the outer surface of a conformal metallic layer. FIGS. 21A to 21C illustrate cross-sectional views of such an embodiment. The strength member assembly 2116 includes a strength member 2118 having a high tensile strength core 2120 and a galvanic layer 2121 surrounding the high tensile strength core 2120. A conformal metallic layer 2134, e.g., formed from aluminum, surrounds the strength member 2118. A groove 2126 is formed in the conformal metallic layer 2134, e.g., is formed along a surface of the conformal layer 2134. The optical fiber 2150 is operatively disposed within the groove along a length of the strength member assembly 2116.

The optical fiber 2150 may be tightly fit, e.g., friction fit, within the groove 2126 by careful selection of the groove width relative to the diameter of the optical fiber 2150. Alternatively, or in addition, the optical fiber 2150 may be secured in the groove using means such as an adhesive (e.g., a flowable adhesive or an adhesive tape). As illustrated in FIG. 21B, a length of a plastic material 2136 such as a thermoplastic or elastomeric material may be tightly placed within the groove and over the optical fiber 2150. In the embodiment illustrated in FIG. 21C, a portion 2134*a* of the conformal metallic layer 2134 is collapsed over the groove to secure the optical fiber 2150 in the groove and couple the optical fiber to the assembly 2102. In an alternative to the embodiment illustrated in FIG. 21C, the groove on the surface of the conformal metallic layer 2134 may be formed with nubs, e.g., a raised portion, on one or both sides of the groove that are then folded over the groove after the optical fiber is disposed in the groove.

Figure 22:
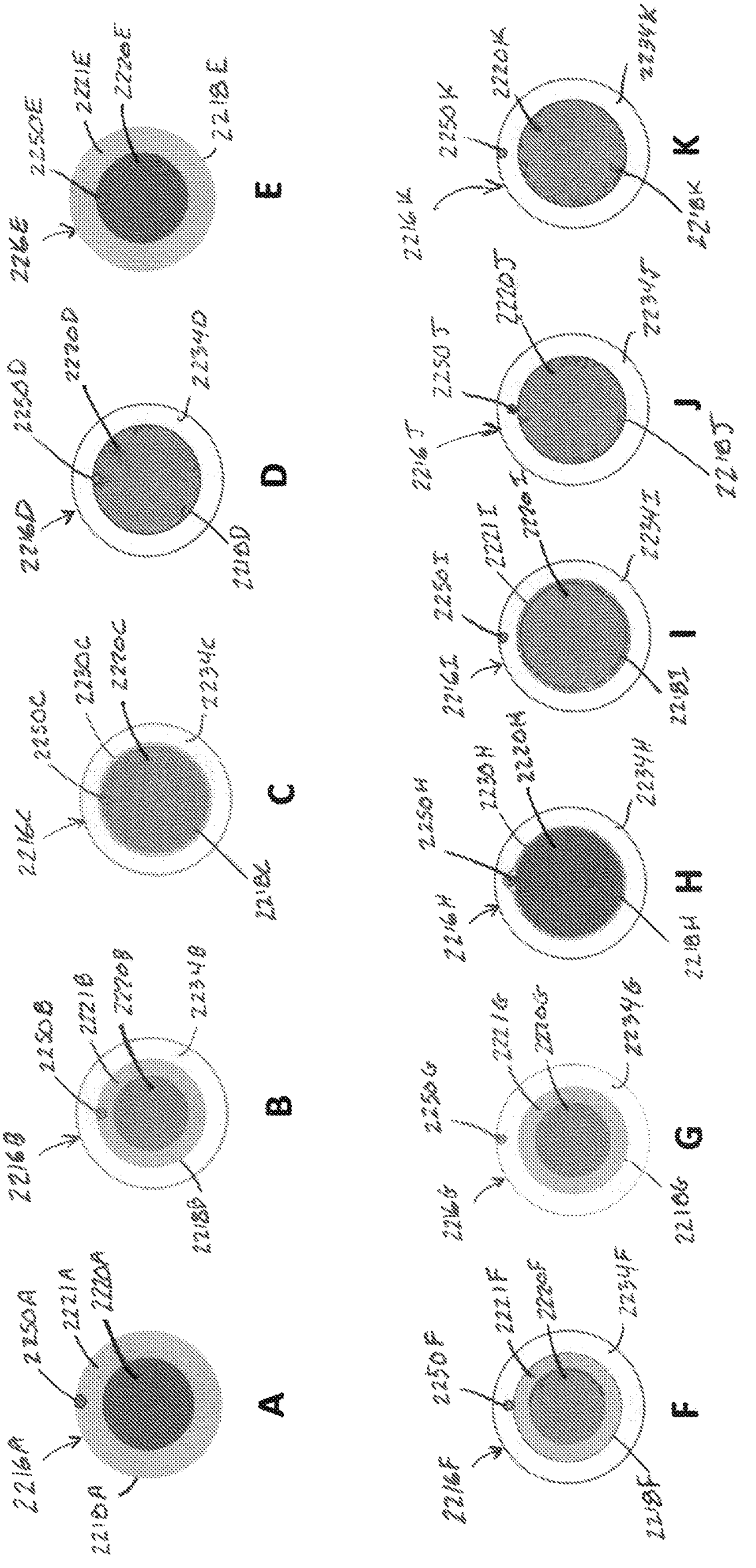
FIG. 22 illustrates cross-sectional views of various strength member assemblies according to an embodiment of the present disclosure

FIG. 22 illustrates a cross-sectional view of various strength member assemblies according to the present disclosure. These cross-sectional views are illustrative of the present disclosure and are not intended to be limiting. Referring to FIG. 22, Embodiment A illustrates a strength member assembly 2216A that includes a strength member 2218A having an inner high tensile strength core 2220A and a glass fiber galvanic layer 2221A. An optical fiber 2250A is disposed in a groove formed in the outer galvanic layer 2221A. Embodiment B illustrates a strength member assembly 2216B that includes a strength member high tensile strength core 2220B surrounded by a galvanic layer 2221B of glass fibers. As with Embodiment A, the glass optical fiber 2250B is disposed in a groove in the galvanic layer 2221B. The strength member and the optical fiber are surrounded by a conformal metallic layer to form the assembly 2216B.

Embodiment C illustrates a strength member assembly 2216C that includes a strength member 2218C having a high tensile strength carbon fiber core 2220C. An optical fiber 2250C is disposed in a groove formed in the high tensile strength core 2220C and the high tensile strength core 2220C and the optical fiber 2250C are surrounded by a tape layer 2230C and by a conformal metallic layer 2234C. In this embodiment, it will be appreciated that the tape layer 2230C may function as both a galvanic protection layer for the carbon fiber high tensile strength core 2220C and as a means to maintain and protect the optical fiber 2250C within the groove. Embodiment D illustrates a strength member assembly 2216D that includes a strength member 2218D having a high tensile strength carbon fiber core 2220D. An optical fiber 2250D is disposed in a groove formed in the high tensile strength core 2220D and the high tensile strength core 2220D and the optical fiber 2250D are surrounded by a conformal metallic layer 2234D.

Embodiment E illustrates a strength member assembly 2216E that includes a strength member 2218E having a high tensile strength carbon fiber core 2220E and a galvanic layer 2221E of glass fibers surrounding the core 2220E. An optical fiber 2250E is disposed in a groove formed in the high tensile strength core 2220E. In this embodiment, it will be appreciated that the optical fiber 2250E may be integrally formed with the strength member 2218E by being pultruded with the carbon fibers that form the core 2220E. Embodiment F illustrates a strength member assembly 2216F that includes a strength member 2218F having a high tensile strength carbon fiber core 2220F and a galvanic layer 2221F of glass fibers surrounding the core 2220F. An optical fiber 2250F is disposed on a surface of the galvanic layer 2221F and the strength member 2218F and the optical fiber 2250F are surrounded by a conformal metallic layer 2234F to form the assembly 2216F.

Embodiment G illustrates a strength member assembly 2216G that includes a strength member 2218G having a high tensile strength carbon fiber core 2220G and a galvanic layer 2221G of glass fibers surrounding the core 2220G. The galvanic layer 2221G is surrounded by a and an optical fiber 2250G is disposed on a surface of the conformal metallic layer 2234G, i.e., in a groove formed in the conformal metallic layer 2234G. Embodiment H illustrates a strength member assembly 2216H that includes a strength member 2218H having a high tensile strength carbon fiber core 2220H. An optical fiber 2250H is disposed on a surface of the high tensile strength core 2220H and the high tensile strength core 2220H and the optical fiber 2250H are surrounded by a tape layer 2230H and by a conformal metallic layer 2234H. In this embodiment, it will be appreciated that the tape layer 2230H may function as both a galvanic protection layer for the carbon fiber high tensile strength core 2220H and as a means to maintain and protect the optical fiber 2250H on the surface of the core 2220H.

Embodiment I illustrates a strength member assembly 2216I that includes a strength member 2218I having a high tensile strength carbon fiber core 2220I surrounded by a tape layer 2230I to provide galvanic protection for the core 2220I. The tape layer 2230I (e.g., the galvanic layer) is surrounded by a conformal metallic layer 2234I and an optical fiber 2250I is disposed within a groove formed on the surface of the conformal metallic layer 2234I. Embodiment J illustrates a strength member assembly 2216J that includes a strength member 2218J having a high tensile strength carbon fiber core 2220J. An optical fiber 2250J is disposed on a surface of the high tensile strength core 2220J and the high tensile strength core 2220J and the optical fiber 2250J are surrounded by a conformal metallic layer 2234J. Embodiment K illustrates a strength member assembly 2216K that includes a strength member 2218K having a high tensile strength carbon fiber core 2220K surrounded by a conformal metallic layer 2234K. An optical fiber 2250K is disposed in a groove formed in the conformal metallic layer 2234K.

Figure 23A:
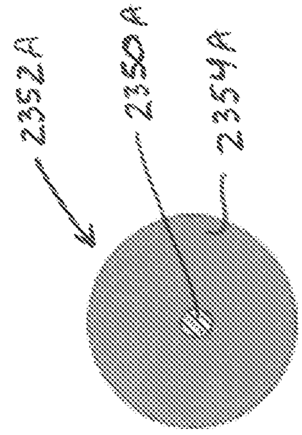
FIGS. 23A-23C illustrate cross-sectional views of a strength member assembly according to an embodiment of the present disclosure.

Another embodiment of the present disclosure relates to a construction for a glass optical fiber where the glass optical fiber includes a relatively thick plastic coating (e.g., a layer or a jacket) to protect the glass core and glass cladding of the optical fiber from damage. As illustrated in FIG. 23A, the large diameter coated optical fiber 2352*a* includes a glass fiber 2350A that is coated (e.g., surrounded by) a relatively thick high-performance plastic coating 2354A. In one characterization, the high-performance plastic coating 2354A is a thermoplastic, e.g., a semi-crystalline thermoplastic. In one refinement, the high-performance plastic coating 2354A is a thermoplastic selected from a polyetheretherketone (PEEK) coating and a polyphenylene sulfide (PPS) coating. Other plastic coatings such as fluorocarbon polymers, e.g., polytetrafluoroethylene, may also be useful, as well as high-performance amorphous plastics such as amorphous polyetherimide (PEI). The large diameter coated optical fiber 2352A may have a relatively large outer diameter as compared to most commercially available optical fibers. For example, the large diameter coated optical fiber 2352A may have an outer diameter of at least about 500 μm, such as at least about 700 μm or even at least about 900 μm. Typically, the outer diameter will be not greater than about 2 mm, such as not greater than about 1.5 mm to avoid displacing a significant amount of material (e.g., reinforcing fiber) from the strength member.

Figure 23B:
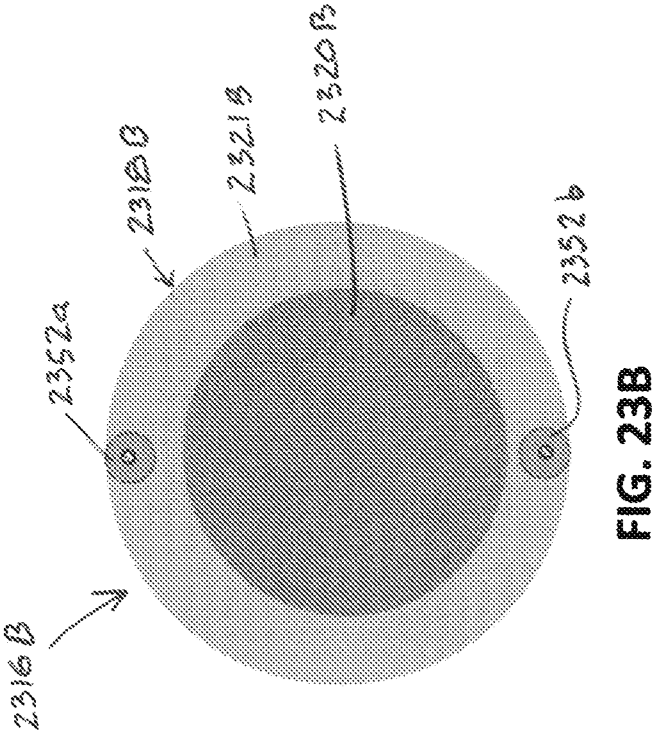
Figure 23C:
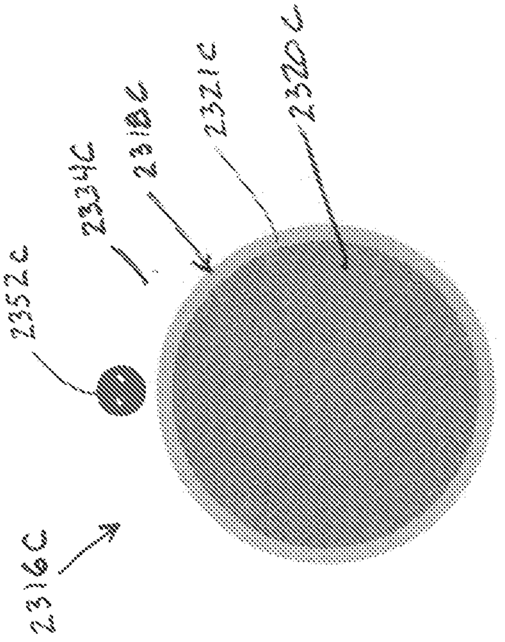

The large diameter coated optical fiber 2352A may be coupled to the strength member in any manner disclosed above. For example, large diameter coated optical fiber 2352A may be coupled directly to the strength member, e.g., and may be coupled to a galvanic layer. For example, as illustrated in FIG. 23B, the large diameter coated optical fiber 2352*a* may be disposed within a groove extending along the length of the strength member 2318B. Alternatively, the relatively thick plastic coating may enable the large diameter coated optical fiber 2352*a* to be integrally formed with the strength member 2318B, e.g., by being pultruded with the reinforcing fibers (e.g., carbon and/or glass fibers) that form the strength member 2318B. As illustrated in FIG. 23B, the strength member assembly 2316B includes a second large diameter coated optical fiber 2352*b* that is similar in construction to large diameter coated optical fiber 2352*a*. FIG. 23C illustrates an alternative construction where the large diameter coated optical fiber 2352*c* is disposed within the conformal metallic layer 2334C, e.g., in manner similar to the embodiment illustrated in FIG. 21A. The embodiment illustrated in FIG. 23C also illustrates that the large diameter coated optical fiber 2352*c* may include two or more glass fibers, e.g., two distinct glass core and glass cladding portions, within a single outer high-performance plastic coating.

The foregoing embodiments are subject to various characterizations with respect to the configurations and selection of materials for the components, some of which are noted above. The optical fibers disclosed in FIGS. 2-13 and FIGS. 16-21 may be characterized in several ways. The term "optical fiber" used herein refers to an elongate and continuous fiber that is configured to transmit incident light down the entire length of the fiber. Typically, optical fibers will include a glass transmissive core and a glass cladding layer surrounding the core that is fabricated from a different material (e.g., having a different refractive index) to reduce the loss of light out of the transmissive core, e.g., through the exterior of the optical fiber. This is in contrast to, for example, a structural fiber (e.g., a structural glass fiber) that has a homogenous composition and is typically placed in a composite material as a fiber tow, i.e., an untwisted bundle of individual filaments.

The glass optical fibers used in the strength element can be, for example, single mode optical fibers or multimode optical fibers. A single mode optical fiber has a small diameter transmissive core (e.g., about 9 μm in diameter) surrounded by a cladding having a diameter of about 125 μm. Single mode fibers are configured to allow only one mode of light to propagate. A multimode optical fiber has a larger transmissive core (e.g., about 50 μm in diameter or larger) that allows multiple modes of light to propagate. Typical glass optical fibers are also supplied with one or more coatings surrounding the glass cladding, e.g., plastic coatings, which increase the typical diameter to from about 250 μm to about 500 μm. Is some configurations, as is disclosed below, the diameter of the optical fiber may be as great as 1 mm, such as up to about 900 μm. Typical coating materials include plasticized polyvinyl chloride (PVC), low/high density polyethylene (LDPE/HDPE), nylon, and polysulfone.

The tape layer(s) illustrated herein, for example in FIGS. 4 to 8, FIG. 13 and FIG. 20, may be pressure-sensitive adhesive (PSA) tapes that include an adhesive layer on one side of the tape, e.g., on the side that is placed onto the strength element. Examples include, but are not limited to, heat resistant aramid fiber tapes such as Nomex® and fiberglass tape. Although described above as a tape, the layer does not necessarily include an adhesive, particularly when the tape layer is tightly wound around the circumference of the strength element. For example, the tape layer may comprise a randomly-oriented fiber mat of fibers such as polyester fibers. Such fiber mats may be particularly useful for holding the optical fiber(s) on the strength member until a subsequent material layer (e.g., a plastic layer and/or a metallic conformal layer) is disposed over the strength element and the optical fiber. In another characterization, the tape layer includes a surface (e.g., the surface contacting the strength element) that is roughened (e.g., includes grit) to enhance the grip of the tape layer onto the strength element, e.g., by an increase in the friction between the tape layer and the strength element. In another characterization, the tape layer may comprise a plastic tape that is heat shrunk onto the strength member. In another characterization, the tape layer may comprise a cylindrical, helically wound biaxial braid that lengthens and narrows when the braid is pulled on, e.g., similar to a "Chinese finger trap" or Kellems grip.

The plastic layers, for example disclosed with respect to FIGS. 9 to 12, FIG. 17 and FIG. 19, may be formed from a variety of plastics (i.e., polymers) including thermoset or thermoplastic polymers, including but not limited to polyetheretherketone (PEEK) and polyphenylene sulfide (PPS). Plastics having good heat resistance and a high dielectric constant are particularly useful. The plastic layer will typically have a thickness of at least about 1.0 mm and not greater than about 10 mm.

The metallic conformal layer illustrated in FIGS. 8, 11, 13, 18 and 19 may be formed from a variety of metals, with aluminum and aluminum alloys being particularly useful. Typically, the metallic conformal layer will have a thickness of at least about 1.0 mm and not greater than about 15 mm.

A difficulty associated with the use of glass optical fibers is that although the theoretical strain to failure of a glass optical fiber is typically about 6% to 8%, randomly formed flaws (e.g., surface defects) along the glass optical fiber significantly reduce the actual strain to failure due to stress concentrations at those flaws, e.g., where a flaw creates a weak point that is susceptible to failure at significantly lower strains. This becomes a significant issue over the extreme lengths of an overhead electrical cable, e.g., hundreds to thousands of meters. Although glass optical fibers may be proof-tested for minimum tensile strain, this has been found to be inadequate for the lengths of optical fibers required for use with overhead electrical cables. For example, when a strength member is tightly wrapped around a spool for storage and transport, the entire length of the strength member is placed under constant strain, which may result in a failure of the optical fiber if a single flaw of sufficient size is subjected to that strain.

In one embodiment of the present disclosure, the glass optical fiber is placed, e.g., intentionally placed, in a stress state when the glass fiber is coupled (e.g., operatively joined) to the strength member. As used herein, the terms coupled or operatively joined mean that the glass optical fiber is placed on or within the strength member in a manner that stress loads applied to the strength member are transferred to the glass optical fiber. According to this embodiment, the glass optical fiber coupled to the strength member is in a state of compressive strain and is maintained in a state of compressive strain, e.g., by being bonded to the strength member. For example, the optical fiber may be in a state of compressive strain even when the strength member itself is in a substantially neutral strain state.

As a result, when a tensile strain is applied to the strength member, such as by wrapping the strength member around a storage spool, the applied tension will have to overcome the compressive strain in the glass optical fiber before the optical fiber will be subjected to a tensile strain. Merely by way of example, if the optical fiber is under a compressive strain of about 0.7%, and the strength member is subjected to a tensile strain of about 1.2%, the optical fiber will only be subjected to a tensile strain of about 0.5%.

Thus, in one embodiment, an elongate strength member assembly configured for use as a central support in an overhead electrical cable is disclosed. The strength member assembly includes at least a strength member and at least one optical fiber coupled to the strength member. Specifically, the strength member assembly includes an elongate strength member having a high tensile strength core and an optical fiber operatively coupled to the strength member, wherein at least a length of the optical fiber that is coupled to the strength member is in a state of compressive strain. It will be appreciated that this embodiment, i.e., where the optical fiber is under a compressive strain, may be implemented with any of the strength member assemblies disclosed above, e.g., with any of the strength member assemblies illustrated in FIGS. 2 to 22.

In one characterization, the length of optical fiber is under a compressive strain of at least about 0.2%, such as at least about 0.5%, or even at least about 0.75%. Typically, the compressive strain will be not greater than about 2%. In one particular characterization, the compressive strain is at least about 0.75% and is not greater than about 1.5%. The length of optical fiber that is under compressive strain may extend along substantially the entire length of the strength member. For example, the length of optical fiber under compressive strain may be at least about 100 meters, at least about 250 meters, at least about 500 meters, at least about 1000 meters, or even at least about 2500 meters.

As noted above, the optical fiber is bonded to the strength member in a manner that substantially maintains the optical fiber in a state of compressive strain, and in a manner that the applied strain, e.g., applied tensile strain, experienced by the strength member is transferred to the optical fiber. The optical fiber may be bonded to a surface of the high tensile strength core, e.g., to the strength element, or may be bonded to a conformal metallic layer, such as an aluminum conformal layer. Merely by way of example, the optical fiber may be bonded to the high tensile strength core using an adhesive, such as by an adhesive tape that is disposed over the optical fiber, e.g., a pressure sensitive adhesive tape. The length of optical fiber may also be disposed within a groove formed along a length of the surface of the high tensile strength core. The optical fiber may be disposed within the groove with an adhesive or with a plastic material such as an elastomer or may be disposed within the groove without an adhesive or plastic material. In one configuration, a conformal metallic layer is placed over the high tensile strength core and the optical fiber In an alternative construction, the length of optical fiber may be bonded to the metallic conformal layer, e.g., bonded to the surface of the conformal metallic layer. For example, the metallic conformal layer may include a groove formed along it surface wherein the length of optical fiber is disposed within the groove. The length of optical fiber may be mechanically bonded within the groove by a portion of the conformal layer that extends over the groove, e.g., as is illustrated in FIG. 21C. Alternatively, or additionally, the length of optical fiber may be bonded to the conformal metallic layer using an adhesive, such as an adhesive tape, or using a plastic such as a thermoplastic that is placed into the groove with the optical fiber In one implementation, the optical fiber includes a high-performance plastic coating surrounding the optical fiber. For example, the high-performance plastic coating may have a continuous service temperature of at least about 150° C., such as at least about 180° C., at least about 200° C., or even at least about 220° C. In one characterization, the high-performance plastic coating is a thermoplastic, e.g., a semi-crystalline thermoplastic. In another characterization, the high-performance plastic coating is a thermoplastic selected from a polyetheretherketone (PEEK) coating and a polyphenylene sulfide (PPS) coating In another embodiment, an overhead electrical cable is disclosed where the overhead electrical cable includes a strength member assembly as disclosed above, i.e., including a strength member assembly having a glass optical fiber under compressive strain, and having at least a first layer of conductive strands wrapped around the support assembly.

Figure 24:
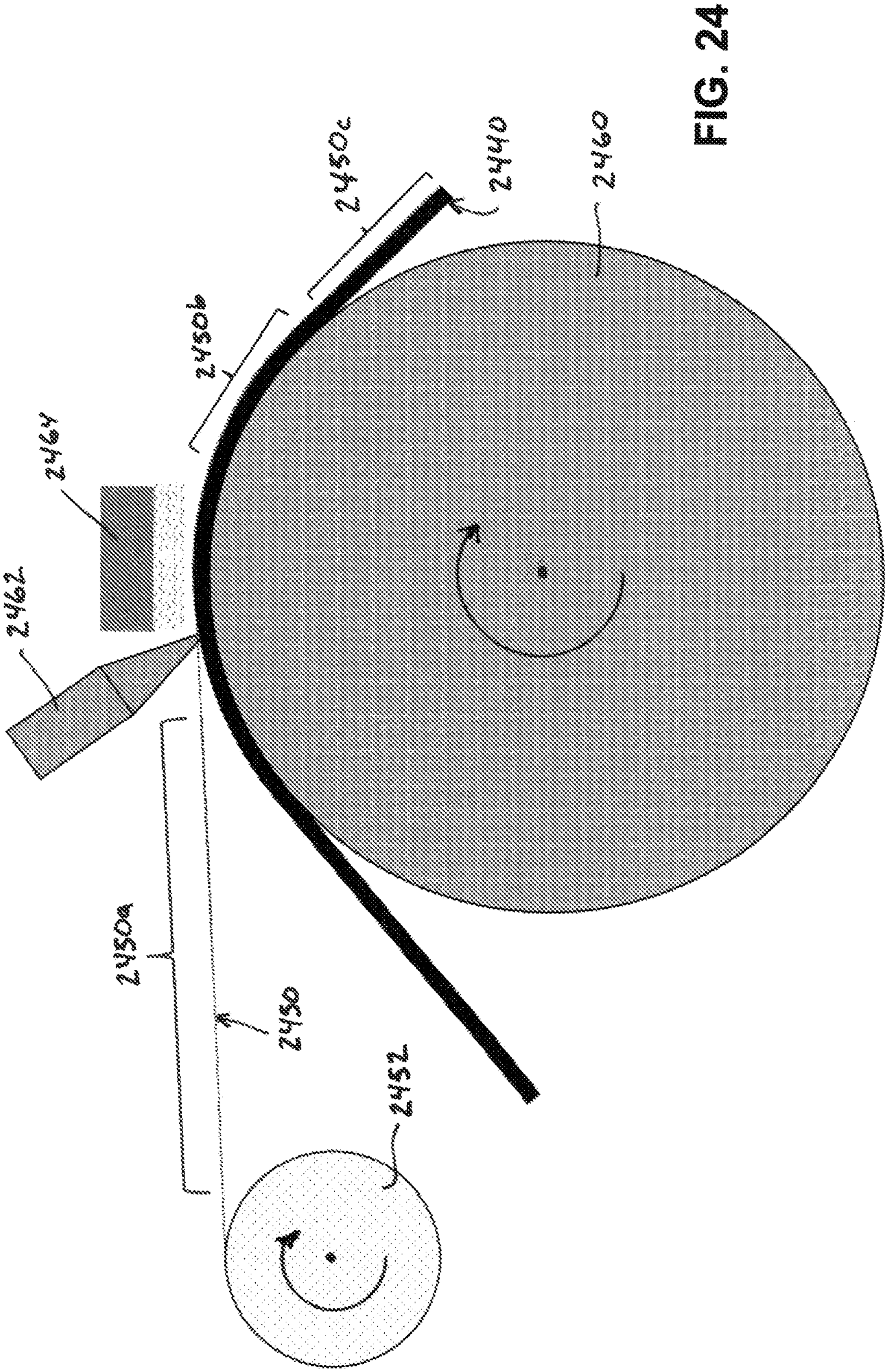
FIG. 24 schematically illustrates a method for the manufacture of a strength member assembly according to an embodiment of the present disclosure.

In another embodiment, a method for the manufacture of a strength member assembly including a glass optical fiber under compressive strain is disclosed. The method includes the steps of placing a portion of an elongate strength member under tensile strain, operatively coupling an optical fiber to the portion of the strength member that is under tensile strain, and releasing the tensile strain on the portion of the strength member, wherein the optical fiber is placed in a state of compressive strain when the tensile strain on the portion of the strength member is released In one implementation the method includes the use of a bending wheel to place the strength member under tension as the optical fiber is coupled to the strength member. As illustrated in FIG. 24, the glass optical fiber 2450 is dispensed from a spool 2452, e.g., as the spool 2452 rotates. Alternatively, the optical fiber may be dispensed from a package that does not require rotation of a spool, as is known to those of skill in the art. As the optical fiber 2450 is dispensed and before the optical fiber is contacted with the strength member 2418, the optical fiber 2450*a* is preferably in a substantially strain free state. That is, the optical fiber is placed under little back-tension as it is dispensed, with only enough tension being applied to ensure control of the payout from the spool. The strength member 2418 is contacted with the bending wheel 2460 as the bending wheel rotates and is tensioned against the bending wheel 2460 which places the strength member 2418 (e.g., the top surface of the strength member) into a state of tension. The amount of tension applied to the strength member may be controlled by selecting the diameter of the bending wheel 2460.

As the optical fiber 2450 contacts the strength member 2418, the optical fiber is bonded to the strength member by applying an adhesive from a dispenser 2462. For example, the adhesive may be an ultraviolet (UV) curable adhesive, in which case an ultraviolet source 2464 may be used to rapidly cure the adhesive. Alternative methods may be used to bond (e.g., to couple) the optical fiber 2450 to the strength member 2418. For example, a heat curable adhesive may be employed. In another implementation, the optical fiber 2450 includes a thermoplastic coating to enable melt bonding of the optical fiber to the strength member 2418. As is noted above, the optical fiber 2450 may be placed in a groove formed in the strength member 2418. As the strength member 2418 and the optical fiber 2450, now coupled to the strength member, release from the bending wheel 2460 the strength member straightens out and puts the bonded optical fiber into a compressive strain state, e.g., the portion of the optical fiber 2450*c*.

Although the strength member assemblies illustrated above include a single strength element to which an optical fiber is coupled, it will be appreciated that the strength member may include a plurality of strength elements, e.g., as is illustrated in FIG. 1B. In this configuration, one or more optical fibers may be coupled to a single strength element, or optical fibers may be coupled to more than one strength element as may be desired for increased accuracy and/or measurement redundancy.

One advantage of the placement of the optical fiber(s) on the outer surface of the strength member (e.g., of a strength element) is that this configuration facilitates the identification and isolation of the optical fibers at the end of the electrical cable, e.g., as is illustrated in the figures above. That is, to connect to optical fibers to transmission and/or detection devices, the ends of the optical fibers must be spliced, e.g., mechanically spliced or fusion spliced, to make the necessary connections. Because the optical fibers are small (e.g., about 125 μm to about 250 μm), they may be difficult to locate particularly during a field installation.

Typically, when a connection to an optical fiber is desired, the outer conductive layers (e.g., the conductor strands) are first cut away from the strength member assembly to expose an end portion of the strength member assembly. Thereafter, the optical fibers must be located and isolated, e.g., where a length of the optical fiber is separated from the strength member assembly while retaining the integrity of the optical fiber. According to certain embodiments, the protective layers (e.g., the tape layer, the plastic layer, and/or the metallic conformal layer) may be gently stripped (e.g., peeled) away to locate the optical fiber(s). Thereafter, the optical fiber may be operatively connected to an interrogation device (e.g., an OTDR device) or to a telecommunications device by splicing, e.g., by fusion splicing.

The embodiment of a large diameter coated optical fiber disclosed with respect to FIGS. 23A-23C advantageously facilitates the identification of the optical fiber due to the relatively large outer diameter of the construction. The large diameter optical fiber may be readily identified and separated from the strength member assembly. Once separated, the outer coating, e.g., of high-performance plastic, may be stripped from the fiber.

Figure 25A:
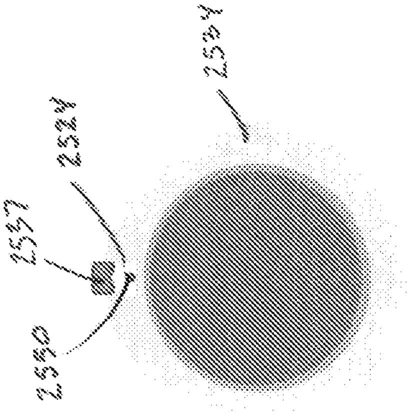
FIGS. 25A-25D schematically illustrate a strength member assembly and a method for the manufacture of a strength member assembly according to the present disclosure.
Figure 25B:
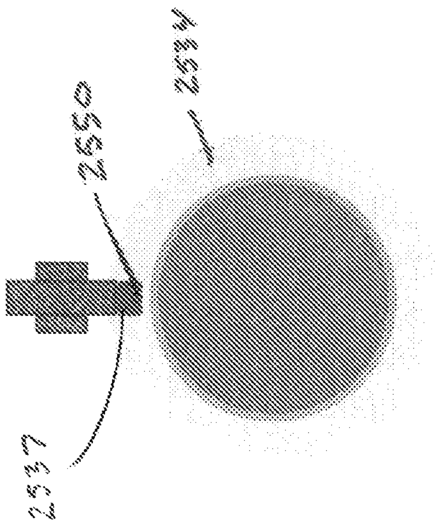
Figure 25C:
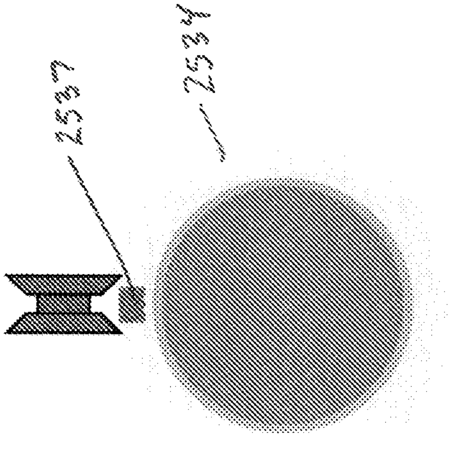
Figure 25D:
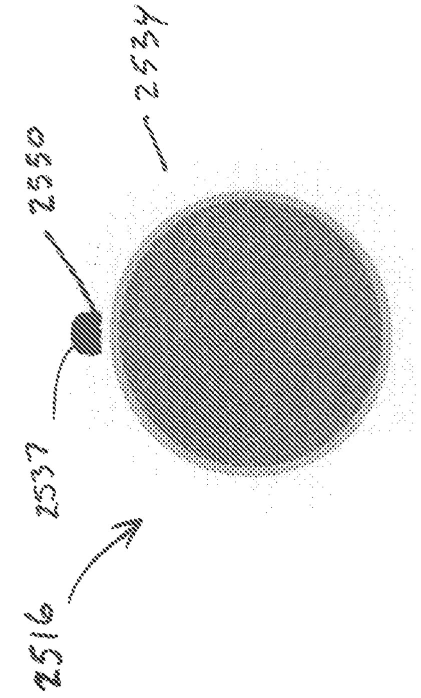

FIGS. 25A-25D schematically illustrate a further embodiment of a strength member assembly and a method for the manufacture of a strength member assembly according to the present disclosure. As is disclosed above, e.g., with respect to FIGS. 21A-21B, a groove 2524 may be formed in a conformal metallic layer 2534 and an optical fiber 2550 may be disposed within the groove 2524. Thereafter, a high-performance plastic material in the form of an elongate strip 2537 may be inserted into the groove 2524, over the optical fiber within the groove 2524. As illustrated in FIGS. 25A-25D, the plastic elongate strip may include a notch to accommodate the optical fiber 2550 within the notch. Once the elongate strip 2524 is pressed into the groove 2524, as illustrated in FIG. 25B, the conformal metallic layer 2534 may be folded over the groove 2525 as is illustrated in FIG. 25C. As a result, the strength member assembly 2516 comprises a conformal metallic layer 2534 wherein the optical fiber 2550 and the elongate strip 2537 of high-performance plastic material 2537 is bonded to the conformal metallic layer 2534 and is protected from compressive forces by the elongate strip 2537. Merely by way of example, the elongate strip may be fabricated from a thermoplastic, e.g., a semi-crystalline thermoplastic. In another characterization, the elongate strip 2537 is formed from a thermoplastic selected from polyetheretherketone (PEEK) and polyphenylene sulfide (PPS). Other plastic materials such as fluorocarbon polymers, e.g., polytetrafluoroethylene, may also be useful, as well as high-performance amorphous plastics such as amorphous polyetherimide (PEI). The elongate strip 2537 may also be fabricated from an elastomer having good thermal resistance properties, such as an elastomeric silicone. In an alternative construction, the elongate strip 2537 may be formed from a metallic material, e.g., the same or similar metallic material (e.g., aluminum) that is used to form the conformal metallic layer 2534.

While various embodiments of configurations and methods for implementing the optical fibers in a strength member assembly and within an overhead electrical cable have been described in detail, it is apparent that modifications and adaptations of those embodiments will occur to those skilled in the art. However, it is to be expressly understood that such modifications and adaptations are within the spirit and scope of the present disclosure.

What is claimed is:

1. An overhead electrical cable comprising:

a strength member assembly comprising at least a first strength element comprising a fiber-reinforced composite material comprising elongate carbon reinforcing fibers disposed in a binding matrix;

an electrical conductor surrounding the strength member assembly, the electrical conductor comprising a plurality of conductive aluminum strands that are helically wrapped around the strength member;

an optical fiber disposed along an outer surface of the first strength element;

a polymer layer disposed over the outer surface of the first strength element and the optical fiber, where the polymer layer is selected from the group consisting of a high performance plastic coating and a polymer tape helically wrapped around the strength element; and an aluminum layer disposed over the polymer layer.

2. The overhead electrical cable recited in claim 1, wherein the strength member comprises a single strength element.

3. The overhead electrical cable recited in claim 1, wherein the strength member comprises a plurality of strength elements.

4. The overhead electrical cable recited in claim 1, wherein the elongate reinforcing fibers comprise carbon fibers.

5. The overhead electrical cable recited in claim 1, wherein the first optical fiber is disposed linearly along the outer surface of the strength element.

6. The overhead electrical cable recited in claim 1, wherein the polymer layer is the polymer tape helically wrapped around the strength element.

7. The overhead electrical cable recited in claim 6, wherein the polymer tape overlaps upon itself to cover the strength member with no gaps.

8. The overhead electrical cable recited in claim 6, wherein the polymer tape comprises aramid fibers.

9. The overhead electrical cable recited in claim 6, wherein the polymer tape has a thickness of at least about 0.05 mm.

10. The overhead electrical cable recited in claim 6, wherein the polymer tape has a thickness of not greater than about 3 mm.

11. The overhead electrical cable recited in claim 1, wherein the aluminum layer has a thickness of at least about 0.4 mm.

12. The overhead electrical cable recited in claim 1, wherein the aluminum layer has a thickness of not greater than about 1.5 mm.

13. A method for the installation of an overhead electrical cable, comprising the steps of:

providing an overhead electrical cable as recited in claim 1;

supporting the overhead electrical cable on a plurality of support towers;

separating a portion of the optical fiber from the strength member at an end of the overhead electrical cable; and operatively attaching the separated portion of the optical fiber to a detection device.

14. The overhead electrical cable as recited in claim 1, wherein the polymer layer comprises a high-performance plastic coating.

15. The overhead electrical cable as recited in claim 14, wherein the high performance plastic coating has a continuous service temperature of at least about 150° C.

16. The overhead electrical cable recited in claim 1, wherein the aluminum layer is a conformal aluminum layer having a thickness of at least about 0.4 mm.

* * * * *